(12) United States Patent
Galloway et al.

(10) Patent No.: US 8,684,291 B2
(45) Date of Patent: Apr. 1, 2014

(54) SYSTEM FOR CONTROLLING THE POSITION OF A FEED ROLLER

(75) Inventors: Edwin N. Galloway, Pella, IA (US); James L. O'Halloran, Pella, IA (US)

(73) Assignee: Vermeer Manufacturing Company, Pella, IA (US)

(*) Notice: Subject to any disclaimer, the term of this patent is extended or adjusted under 35 U.S.C. 154(b) by 694 days.

(21) Appl. No.: 12/599,672

(22) PCT Filed: May 1, 2008

(86) PCT No.: PCT/US2008/062236
§ 371 (c)(1),
(2), (4) Date: Sep. 1, 2010

(87) PCT Pub. No.: WO2008/140956
PCT Pub. Date: Nov. 20, 2008

(65) Prior Publication Data
US 2011/0006142 A1    Jan. 13, 2011

Related U.S. Application Data

(60) Provisional application No. 60/928,926, filed on May 10, 2007.

(51) Int. Cl.
*B02C 25/00* (2006.01)
(52) U.S. Cl.
USPC .......................................................... 241/34
(58) Field of Classification Search
USPC ............................... 241/92, 34, 35
See application file for complete search history.

(56) References Cited

U.S. PATENT DOCUMENTS

| | | | |
|---|---|---|---|
| 2,561,069 A | 7/1951 | Peterson | |
| 2,821,345 A | 1/1958 | Donath | |
| 2,927,740 A | 3/1960 | Berk | |
| 3,182,917 A | 5/1965 | Tamny et al. | |
| 3,516,539 A | 6/1970 | Gulstrom et al. | |
| 3,523,411 A | 8/1970 | Waldrop et al. | |
| 3,701,483 A | 10/1972 | Crosby et al. | |
| 3,825,192 A | 7/1974 | Knight | |
| 3,863,848 A | 2/1975 | Mashuda | |
| 3,944,146 A | 3/1976 | Stockmann et al. | |
| 3,955,765 A * | 5/1976 | Gaitten | 241/28 |
| 3,990,568 A | 11/1976 | Wilson, Sr. | |
| 4,069,911 A | 1/1978 | Ray | |
| 4,073,377 A | 2/1978 | Stoessel et al. | |

(Continued)

FOREIGN PATENT DOCUMENTS

| | | |
|---|---|---|
| JP | 2004167797 A | 6/2004 |
| WO | WO 98/15395 | 4/1998 |

OTHER PUBLICATIONS

Peterson 4710 Track-Mounted Recycler Preliminary Manual, cover page, pp. 11, 12, 138, 199, 200 and 219 (Aug. 2004).

(Continued)

*Primary Examiner* — Mark Rosenbaum
(74) *Attorney, Agent, or Firm* — Merchant & Gould P.C.

(57) ABSTRACT

A feed system that is configured to more effectively grab and pull brush and tree materials into a chipper is provided. The system of the present disclosure is configured such that a large, heavy tree trunk can be effectively pulled into the chipper. The system includes a hydraulic pump that applies variable down pressure on a feed roller.

29 Claims, 21 Drawing Sheets

(56) References Cited

U.S. PATENT DOCUMENTS

| | | |
|---|---|---|
| 4,078,590 A | 3/1978 | Smith |
| 4,078,592 A | 3/1978 | Standal |
| 4,223,845 A | 9/1980 | Selonke et al. |
| 4,338,985 A | 7/1982 | Smith et al. |
| 4,340,137 A | 7/1982 | Foster |
| 4,510,981 A | 4/1985 | Biller |
| 4,515,318 A | 5/1985 | Savonjousi |
| 4,598,745 A | 7/1986 | Parviainen |
| 4,625,924 A | 12/1986 | Killinger |
| 4,632,318 A | 12/1986 | Hyuga |
| 4,633,776 A | 1/1987 | Blackmore et al. |
| 4,799,625 A | 1/1989 | Weaver, Jr. et al. |
| 4,805,676 A | 2/1989 | Aikins |
| 4,898,221 A | 2/1990 | Eriksson |
| 4,907,632 A | 3/1990 | Reuter |
| 4,927,088 A | 5/1990 | Brewer |
| 4,934,612 A | 6/1990 | Johnson |
| 4,943,259 A | 7/1990 | Felstehausen |
| 5,020,579 A | 6/1991 | Strong |
| 5,041,057 A | 8/1991 | Felstehausen |
| 5,062,571 A | 11/1991 | Arno et al. |
| 5,078,327 A | 1/1992 | Kemetter |
| 5,088,532 A | 2/1992 | Eggers et al. |
| 5,137,219 A | 8/1992 | Morey |
| 5,205,496 A | 4/1993 | O'Donnell et al. |
| 5,230,475 A | 7/1993 | Gerner |
| 5,293,479 A | 3/1994 | Quintero et al. |
| 5,417,265 A | 5/1995 | Davenport et al. |
| 5,472,146 A | 12/1995 | Doppstadt |
| 5,526,885 A | 6/1996 | Kuvshinov et al. |
| 5,676,238 A | 10/1997 | Saastamo |
| 5,881,959 A | 3/1999 | Hadjinian et al. |
| 5,924,637 A | 7/1999 | Niederholtmeyer |
| 5,947,395 A | 9/1999 | Peterson et al. |
| 6,026,871 A | 2/2000 | Chapman |
| 6,293,479 B1 | 9/2001 | Kaczmarski et al. |
| 6,318,056 B1 | 11/2001 | Rauch et al. |
| 6,357,684 B1 | 3/2002 | Morey |
| 6,641,065 B2 | 11/2003 | Bardos et al. |
| 6,722,596 B1 | 4/2004 | Morey |
| 6,729,567 B1 | 5/2004 | Morey |
| 6,769,836 B2 | 8/2004 | Lloyd |
| 6,814,320 B1 | 11/2004 | Morey et al. |
| 6,830,204 B1 | 12/2004 | Morey |
| 6,843,435 B2 | 1/2005 | Verhoef et al. |
| 6,853,531 B2 | 2/2005 | Mather et al. |
| 6,929,202 B2 | 8/2005 | Haikkala et al. |
| 6,955,310 B1 | 10/2005 | Morey |
| 6,978,955 B2 | 12/2005 | Verhoef et al. |
| 7,011,258 B2 | 3/2006 | O'Halloran et al. |
| 7,040,558 B2 | 5/2006 | Stelter et al. |
| 7,044,409 B2 | 5/2006 | Stelter et al. |
| 7,048,212 B2 | 5/2006 | Carey |
| 7,070,132 B1 | 7/2006 | Gassman |
| 7,077,345 B2 | 7/2006 | Byram et al. |
| 7,441,718 B2 * | 10/2008 | Seaman et al. ............ 241/34 |
| 7,481,386 B2 | 1/2009 | Hartzler et al. |
| 7,637,444 B2 * | 12/2009 | Stelter et al. ............ 241/28 |
| 7,874,504 B2 | 1/2011 | Chapman et al. |
| 2002/0070301 A1 | 6/2002 | Stelter et al. |
| 2002/0139877 A1 | 10/2002 | Beam, III |
| 2003/0111566 A1 | 6/2003 | Seaman et al. |
| 2006/0196981 A1 | 9/2006 | Stelter et al. |
| 2007/0001038 A1 | 1/2007 | Bouwers et al. |
| 2007/0069051 A1 | 3/2007 | Hartzler et al. |
| 2007/0108323 A1 | 5/2007 | Chapman et al. |
| 2011/0073691 A1 | 3/2011 | O'Halloran et al. |

OTHER PUBLICATIONS

RC6D Brush Chipper, 6" Capacity Disc, Rayco Manufacturing, Inc., 6 pages (Copyright 2006).

RC12D Brush Chipper, 12" Capacity Disc, Rayco Manufacturing, Inc., 7 pages (Copyright 2006).

RC12 Brush Chipper, 12" Capacity Drum, Rayco Manufacturing, Inc., 6 pages (Copyright 2006).

RC20 Brush Chipper, 20" Capacity Drum, Rayco Manufacturing, Inc., 6 pages (Copyright 2006).

Welcome to Rayco Manufacturing's Used Machines, http://www.raycopreowned.com/11/01/2006, 4 pages (Date Printed Nov. 1, 2006).

* cited by examiner

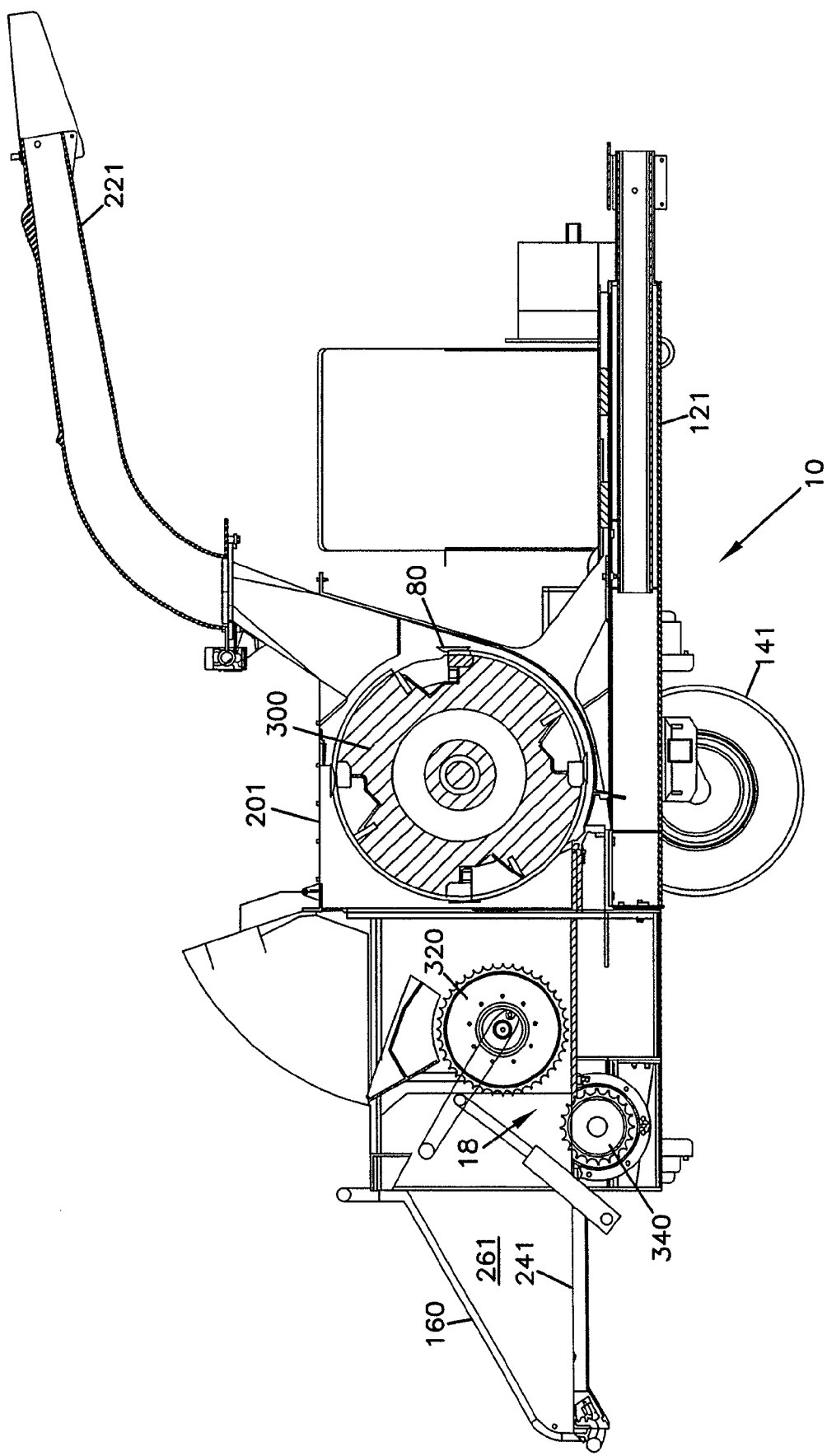

SYSTEM FOR CONTROLLING THE POSITION OF A FEED ROLLER

This application is a National Stage Application of PCT/US2008/062236, filed May 1, 2008, in the name of Vermeer Manufacturing Company, a U.S. national corporation, applicant for the designation of all countries except the US, and Edwin N. Galloway and James L. O'Halloran, citizens of the U.S., applicants for the designation of the US only, and claims priority to U.S. Provisional Patent Application Ser. No. 60/928,926, filed May 10, 2007, and which applications are incorporated herein by reference. To the extent appropriate, a claim of priority is made to each of the above disclosed applications.

TECHNICAL FIELD

The present invention relates generally to chipper devices and, more specifically, a system for controlling the position of a feed roller.

BACKGROUND

Chippers are used to reduce branches, trees, brush, and other bulk wood products into small chips. Chippers typically include a feed chute, one or more feed rollers, a chipping mechanism, and a drive system for powering feed rollers and the chipping mechanism. Through the operation of the feed rollers, products to be chipped are brought into contact with the chipping mechanism, which grinds, flails, or cuts the wood products into small pieces. The performance of a chipper is in part dependent on the ability of the feed rollers to continually grab and pull the materials to be chipped from the feed chute into the chipper.

A known feed roller configuration includes two opposed feed rollers that can be moved towards or away from each other. Such feed rollers are configured so that the distance between the feed rollers varies to accommodate the differences in the sizes of the materials to be chipped. The force that directs the feed rollers towards each other can affect the ability of the feed rollers to pull materials to be chipped into the chipper. For example, if the force directing the feed rollers together is too small, the rollers may slip along the surface of a large, heavy log and fail to pull the log into the chipper. If the force is too large, it can cause the material to be chipped to jam instead of feed. Accordingly, a constant force system is not ideal. In addition, a system that can be turned on and off automatically can be advantageous.

Several systems for applying a variable force to direct the feed rollers together are known. Some such systems utilize springs, while others incorporate hydraulic fluid pressure. See, for example, U.S. Pat. No. 6,357,684 to Morey; U.S. Pat. No. 3,955,765 to Gaitten; and U.S. Pat. Pub. 2003/0111566 to Seaman et al. The controllability of spring systems is limited, and efficiency and effectiveness of existing hydraulic systems can be improved upon.

SUMMARY

The present disclosure relates to a system for controlling the position of a feed roller that enables the chipper to more effectively grab and pull brush and tree materials into the chipper. The system of the present disclosure is configured such that a large, heavy tree trunk can be effectively pulled into the chipper.

In one embodiment, hydraulic fluid from a pump that is independent from a feed roller drive pump is used to effectively and efficiently apply an appropriate force between feed rollers.

BRIEF DESCRIPTION OF THE DRAWINGS

FIG. 17 depicts an alternative embodiment of the hydraulic cylinder arrangement for a chipper.

DETAILED DESCRIPTION

Figure 1:
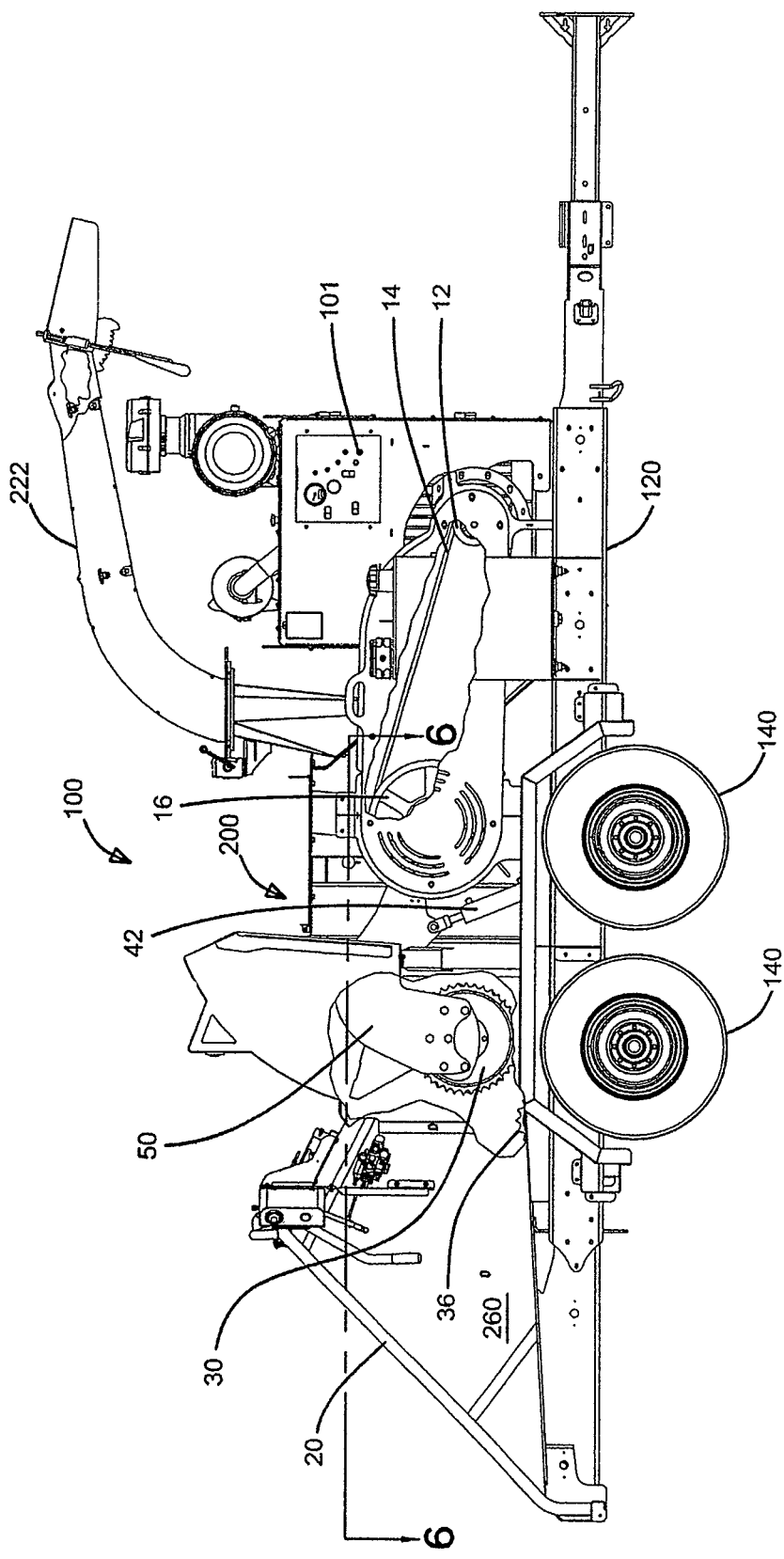
FIG. 1 is a right side view of a chipper according to the principles of the present invention with certain outer portions removed to show the upper feed roller in a lowered position.
Figure 2:
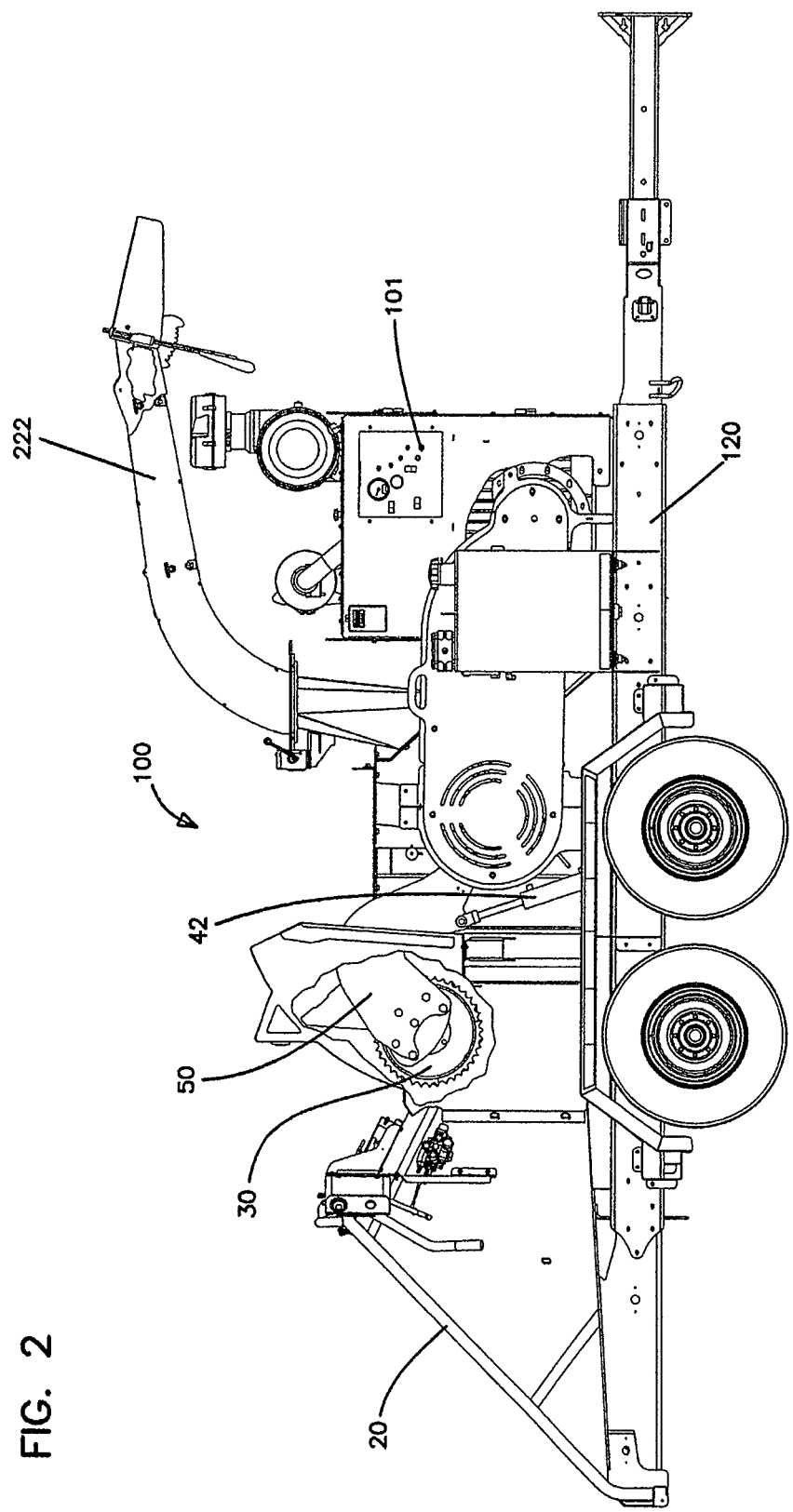
FIG. 2 is a right side view of the chipper of FIG. 1 with certain outer portions removed to show the upper feed roller in a raised position.
Figure 3:
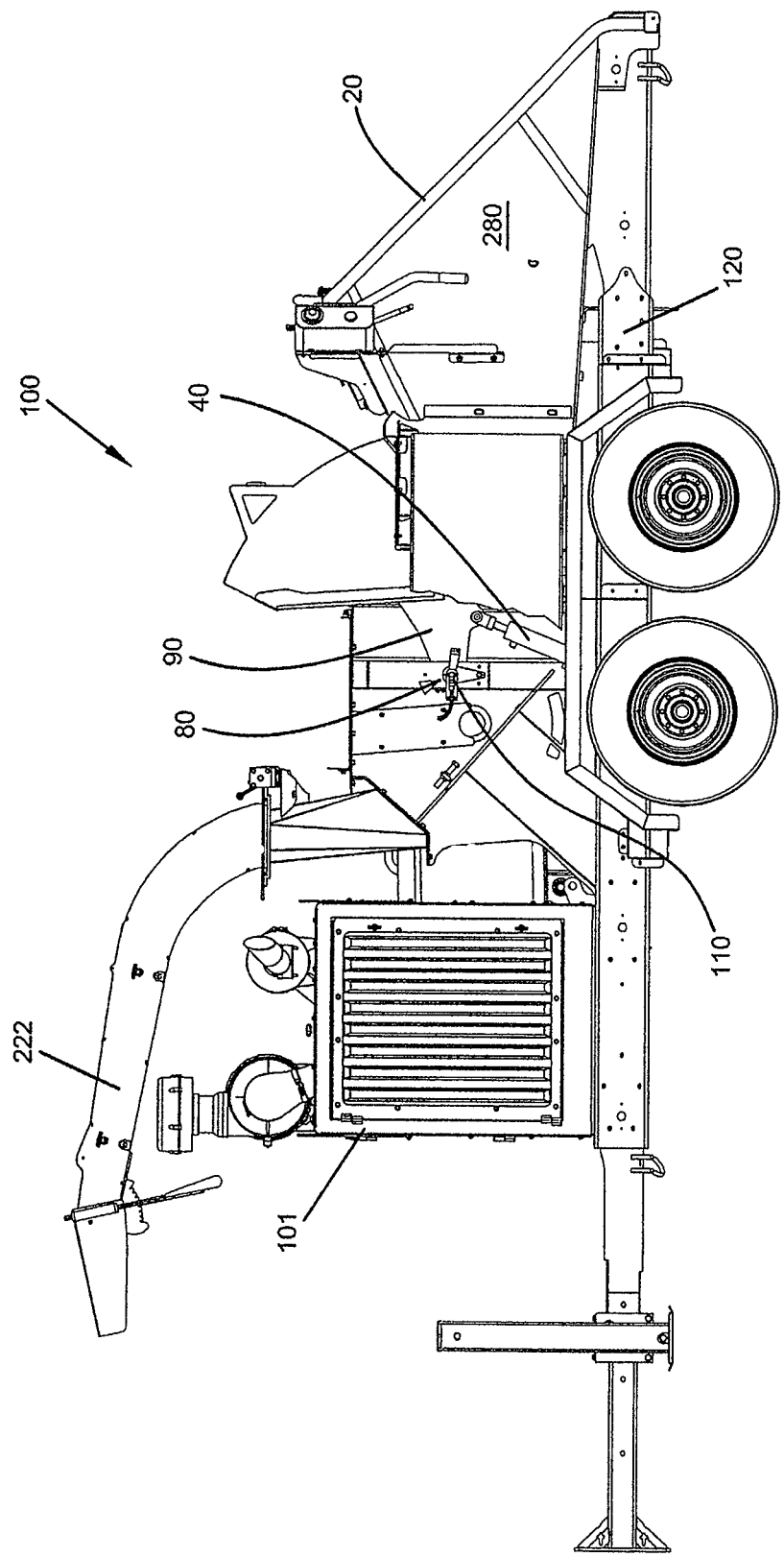
FIG. 3 is a left side view of the chipper of FIG. 1 with certain outer portions removed.

Referring to FIGS. 1-3, a chipper is shown. In the first depicted embodiment the chipper 100 is mounted to a frame 120 that is supported on wheels 140, which enable the chipper 100 to be conveniently moved. The depicted chipper 100 includes a feed chute 20, which is also commonly referred to as a feed table. The feed chute 20 can be any structure located at the rear of the chipper 100 that facilitates the loading of materials to be chipped into the chipper 100. (The material to be chipped can be any material that the user desires to reduce to chips. The material is most commonly brush and tree parts, therefore, for convenience the material to be chipped will be referred to herein interchangeably as wood, trees, or brush.)

Figure 10:
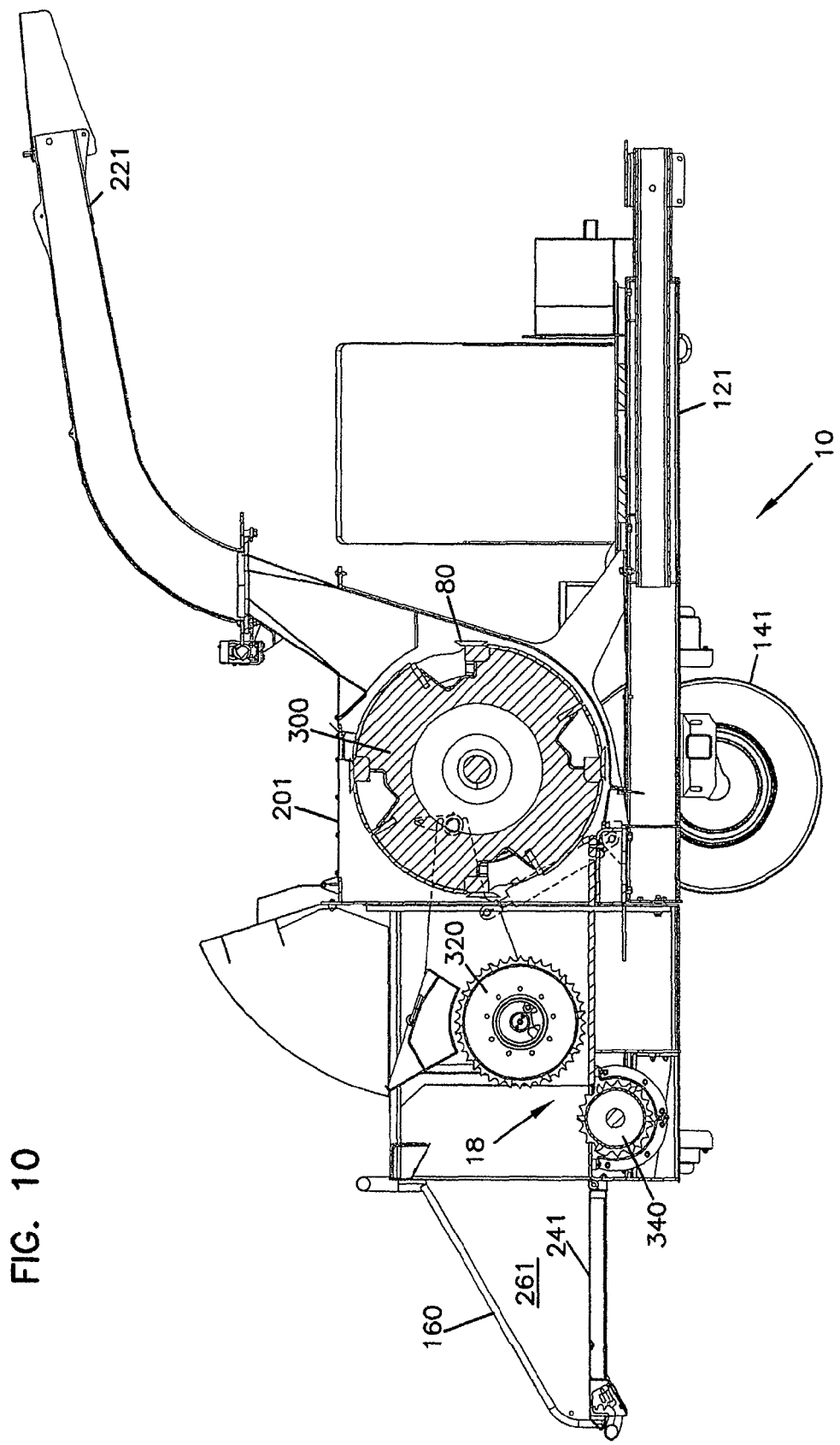
FIG. 10 is a side cross-sectional view of the chipper along lines A-A in FIG. 9.

The chipper 100 in the depicted embodiment includes a feed system that grabs and pulls brush from the feed chute 20 into a body portion 200 of the chipper 100. The body portion 200 houses cutters 80 (not shown in FIGS. 1-3, but shown in FIGS. 10-12) that cut the brush into small chips. The cutters 80 are shown as blades mounted on a drum 300 (shown in FIG. 10-12). However, it should be appreciated that the cutter can be any structure that is capable of breaking the material to be chipped into chips (e.g., disk cutters). Once the material is broken into small chips, the chips are then projected out of the chipper 100 through a discharge chute 221, 222.

The feed chute 20 is provided at the rear of the chipper 100 to facilitate the loading of brush and trees into the chipper 100. In the depicted embodiment the feed chute 20 includes a flat table portion 240 (loading surface, see FIG. 6) and two angled side walls 260, 280 (shown in FIGS. 2 and 3). It should be appreciated that many other configurations of the feed chute 20 are possible. Feed chutes are described in greater detail in a related application filed on May 10, 2007, titled WOOD CHIPPER INFEED CHUTE, which is incorporated herein by reference. Once the brush is grabbed by the feed system the brush is moved into contact with the cutter drum that is housed within the body 200 of the chipper 100 (not shown in FIGS. 1-3, but shown in FIGS. 10-12). The cutter drum 300 spins cutting blades 80 at a high rate of speed, which thereby reduces the brush and wood that contact the drum 300 into small chips that are projected out the discharge chute 221, 222. Drum arrangements are described in greater detail in a related application filed on May 10, 2007, titled CHIPPER DRUM WITH INTEGRAL BLOWER which is incorporated herein by reference (No. 60/928,928).

Still referring to FIGS. 1-3, the chipper 100 is described in greater detail. The chipper 100 includes an engine 101 with a drive pulley 12 that provides the drive force through belt 14 to the driven pulley 16, which is mounted to a chipping drum. The feed chute 20 is configured to allow an operator of the chipper to feed branches to an upper feed roller 30 and a lower feed roller 36. The upper feed roller 30 and the lower feed roller 36 are constructed to engage the wood in order to pull it towards the chipper drum. The construction of the upper and lower feed rollers 30, 36 is described in greater detail in a related application filed on May 10, 2007, titled WOOD CHIPPER FEED ROLLER, which is incorporated herein by reference.

In the depicted embodiment, the upper feed roller 30 is mounted so that it can move from a lowered position as shown in FIG. 1 to a raised position as shown in FIG. 2. When the upper feed roller 30 is raised, cylinder 42 is in an extended configuration shown in FIG. 2, as compared to its retracted configuration shown in FIG. 1. In the depicted embodiment, the lower feed roller 36 rotates in a stationary position. It should be appreciated that in alternative embodiments the lower feed roller 36 could also be movable.

FIG. 3 is a side view from the left side of the chipper 100, with a portion of the machine cut away to illustrate a mount assembly 50 including an arm 90 driven by the cylinder 40, and pivot 80 about which the arm 90 pivots when driven by the cylinder 40. A rotary potentiometer 110 is mounted at pivot 80 such that the position of the feed roller can be monitored by measuring the angular position of the arm 90, of mount assembly 50. Rotary potentiometers are well known. In the depicted embodiment the rotary potentiometer is shown as an Angular Position Sensor AN101101 available from The Cherry Corporation. It includes a main body with a rotatable center section that can be driven by a drive tab. The potentiometer configuration is described in greater detail below with reference to FIG. 7.

Figure 4:
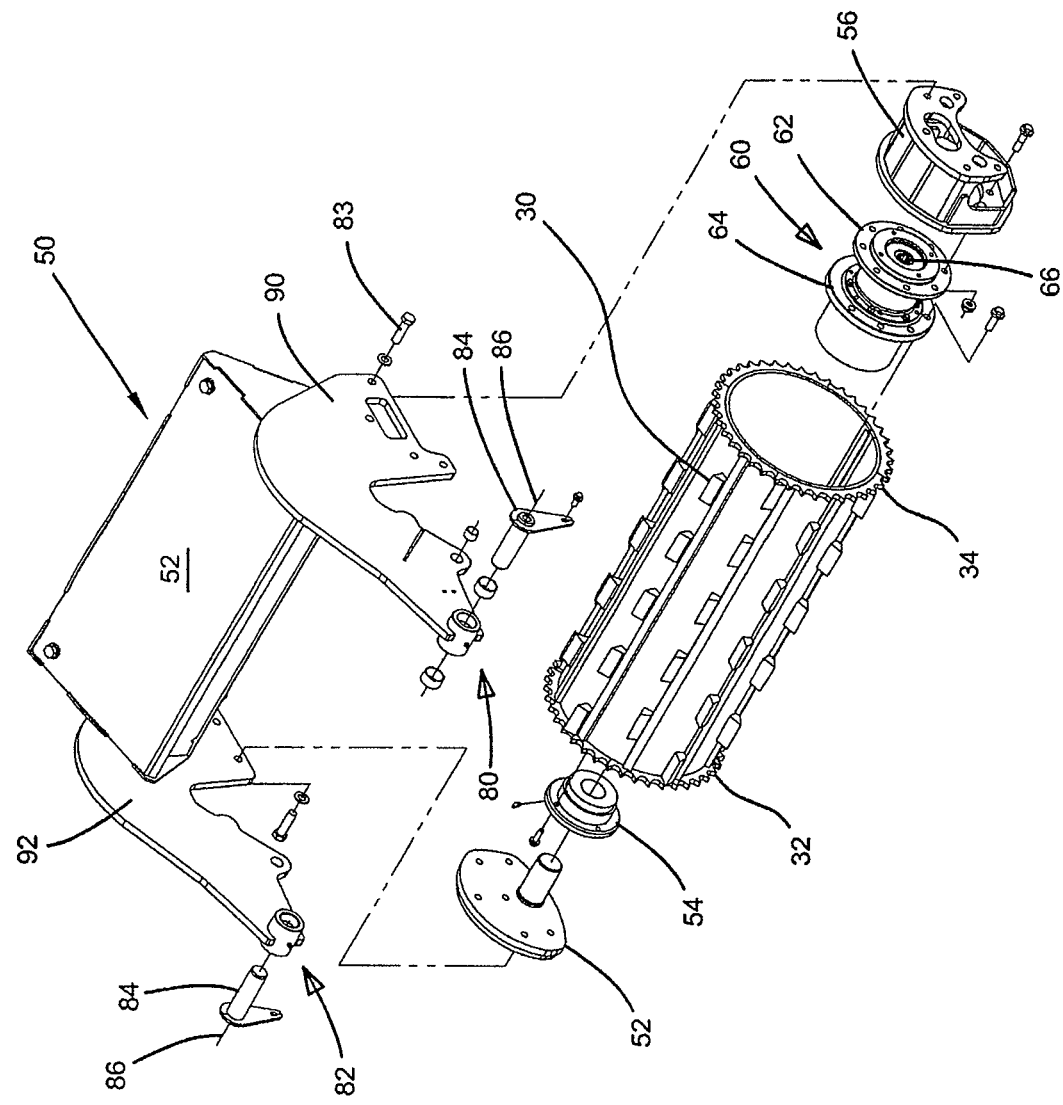
FIG. 4 is an assembly view of the upper feed roller used in the chipper of FIG. 1 and a corresponding mount assembly.

Referring to FIG. 4, the mount assembly 50 and the feed roller 30 are shown in greater detail. In the depicted embodiment, a first end of the feed roller 30 adjacent end plate 32 is supported by an idler adaptor 52 which is bolted to the mount assembly 50. The idler adaptor 52 is configured to support bearing assembly 54 that is mounted to the upper feed roller 30 to enable the upper feed roller 30 to rotate freely. A second end of the upper feed roller 30 adjacent end plate 34 is supported by a drive adaptor 56 which is bolted to the mount assembly 50. The drive adaptor 56 is configured to support planetary drive assembly 60. In the depicted embodiment, a first flange 62 of the planetary drive assembly 60 is bolted to the drive adaptor 56, and a second flange 64 of the planetary drive assembly 60 is bolted to the upper feed roller 30. The planetary drive assembly 60 further includes an internally splined drive adaptor 66, which when rotated causes the first flange 62 to rotate relative to the second flange 64.

Figure 5:
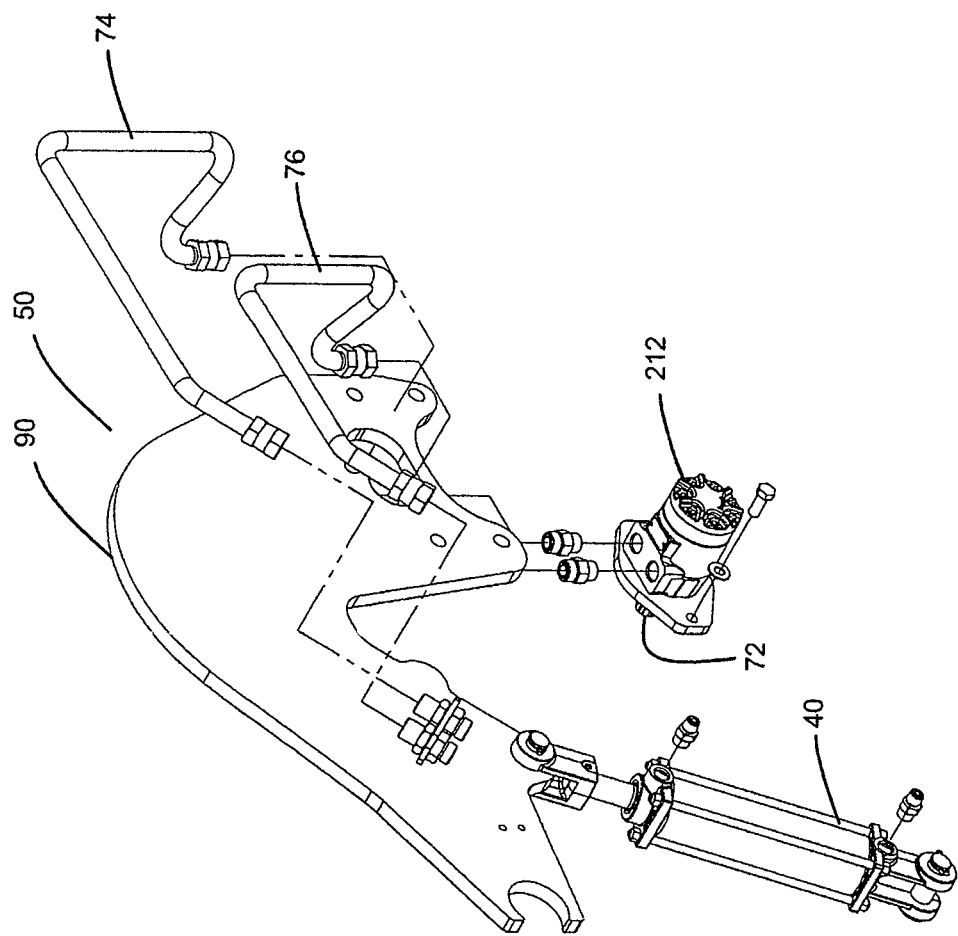
FIG. 5 is an assembly view of a hydraulic motor and mounting arm used in the chipper of FIG. 1.

Referring to FIG. 5, the hydraulic motor 212 that powers the upper feed roller 30 is shown. The hydraulic motor 212 includes a drive shaft 72 that is configured to connect to and drive the internally splined drive adaptor 66 of the drive assembly 60. Hydraulic tubes 74 and 76 transfer hydraulic fluid to and from the hydraulic motor 212.

Figure 6:
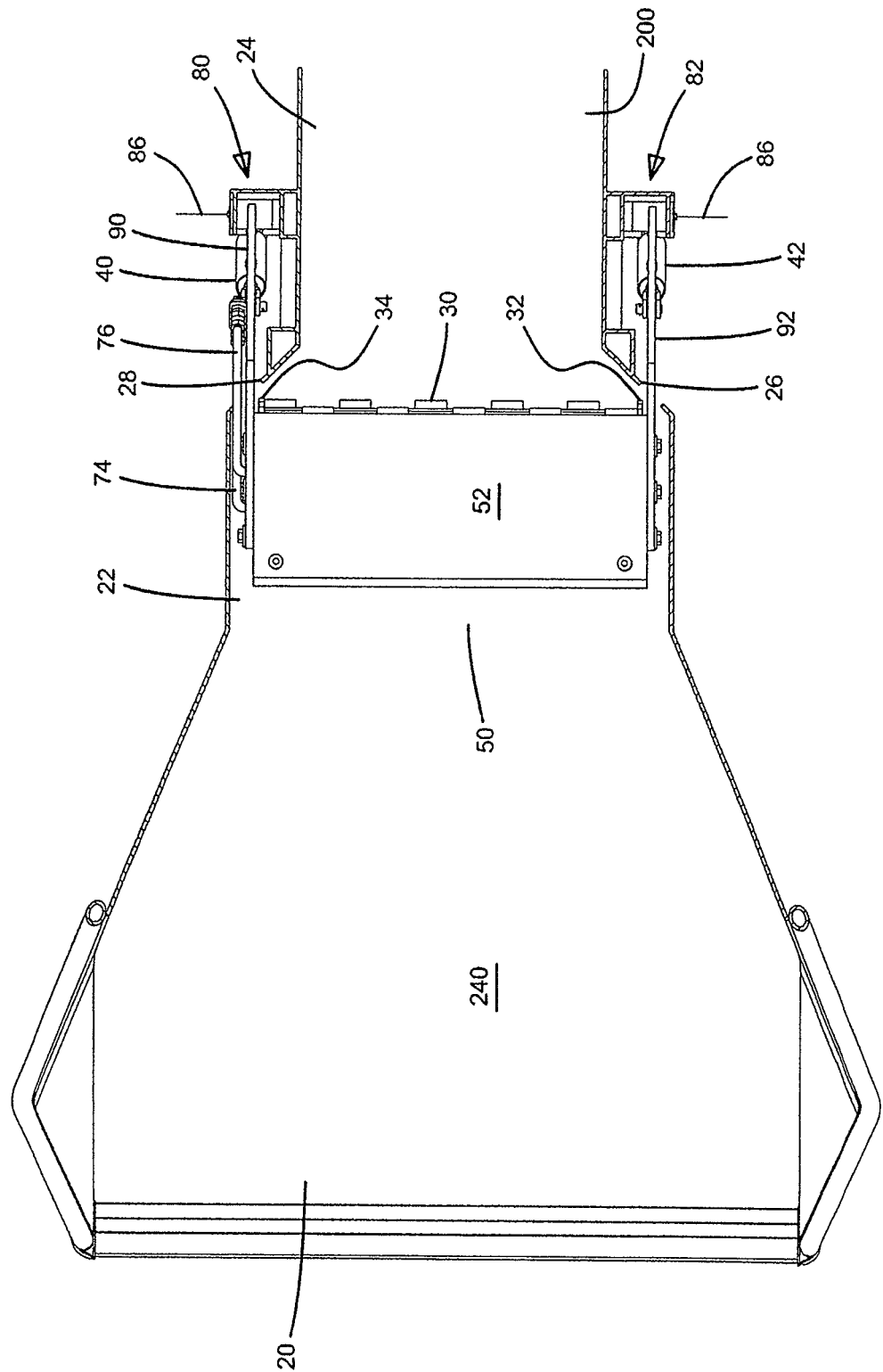
FIG. 6 is cross-sectional view along line 6-6 of FIG. 1.
Figure 13:
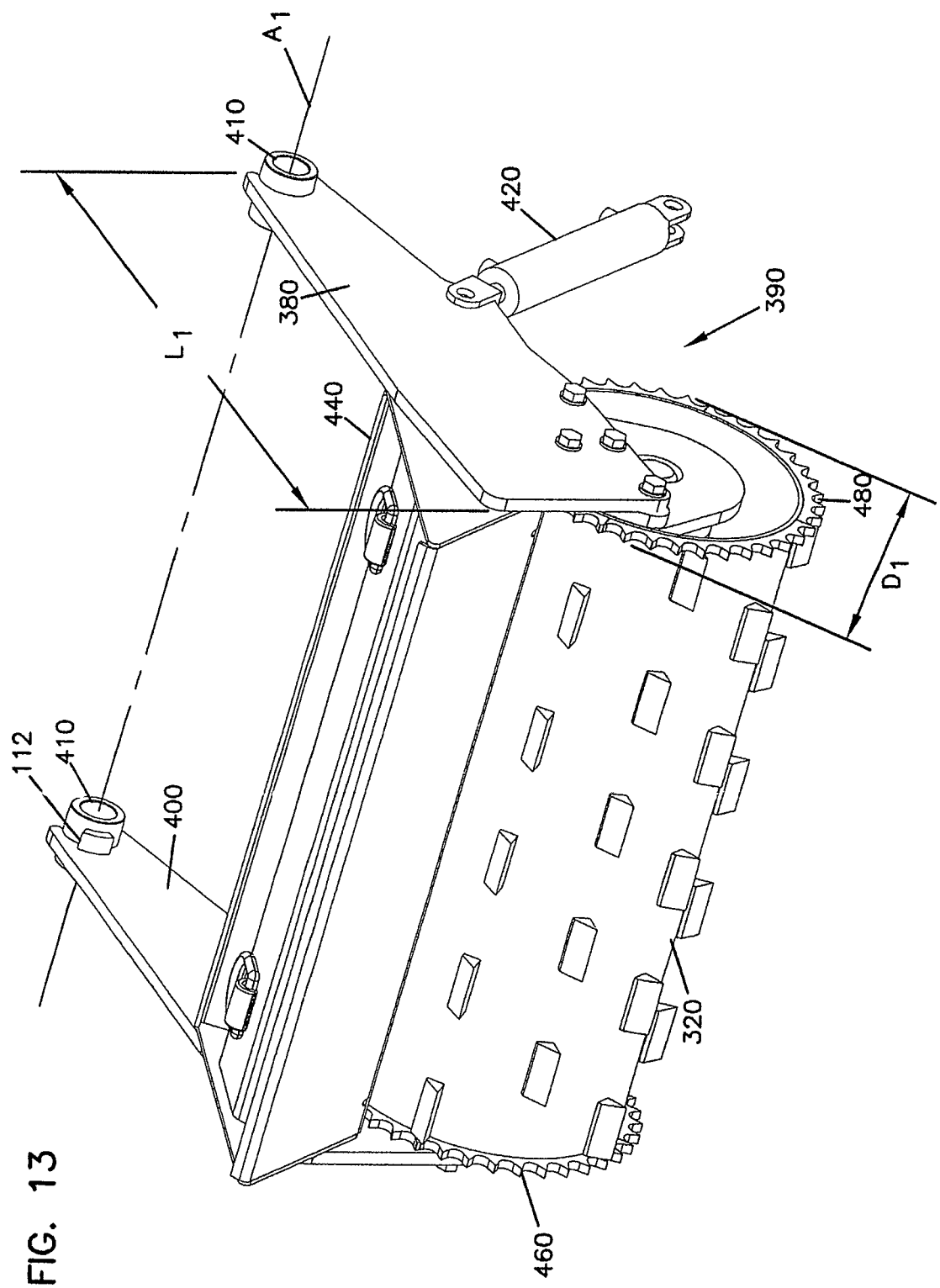
FIG. 13 is a perspective view of a feed roller of FIG. 9 attached to a mount assembly.

Referring to back to FIGS. 3, 4 and also FIG. 6, the mount assembly 50 is described in greater detail. The mount assembly 50 attaches the upper feed roller 30 to the frame 120 at pivot 80 on the second side of the chipper frame and pivot 82 on the first side of the chipper frame. The width of mount assembly 50 defined by the distance between arms 90 and 92 is greater than the width of the feed roller 30. Arms 90 and 92 extend from the pivots 80 and 82 to the upper feed roller 30. In the depicted embodiment the upper feed roller 30 is secured to the arms via standard means such as bolts 83. An alternative embodiment of an assembled mount assembly is shown in FIG. 13. A deflector guard 52 is mounted between the arms 90, 92 above the upper feed roller 30. In the depicted embodiment the width of the mount assembly is less than the width of the feed chute 20 at its widest location. In the depicted embodiment the feed chute 20 tapers to a feed area 22 where the feed roller 30 is located. The body 200 of the chipper 100 further tapers to a chipper drum area 24. The chipper drum area 24 is narrower than the feed roller 30. In the depicted embodiment the chipper drum has a width that is less than the width of the upper feed roller 30. The tapered portion between the feed area 22, and the chipper drum area 24, includes slots 26 and 28 that allow arms 90 and 92 to pass from inside the feed chute 20 to outside of the chipper drum area 24 to engage the pivots 80 and 82. Both pivots 80 and 82 include a pivot pin 84 that is aligned with axis 86 that defines the axis of rotation for the mount assembly 50.

Figure 7A:
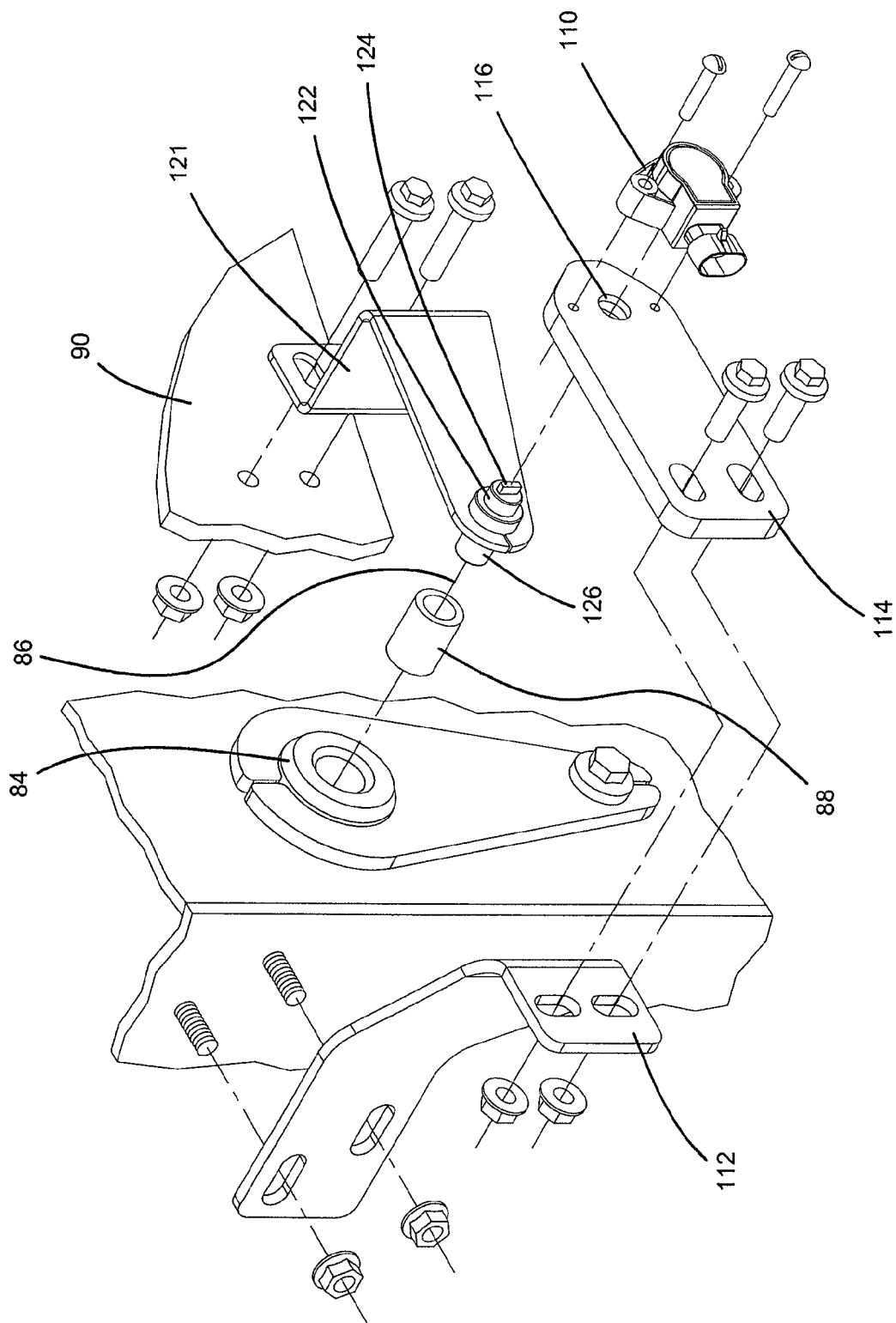
FIG. 7A is an assembly view of a potentiometer mount assembly used in the chipper of FIG. 1.
Figure 7B:
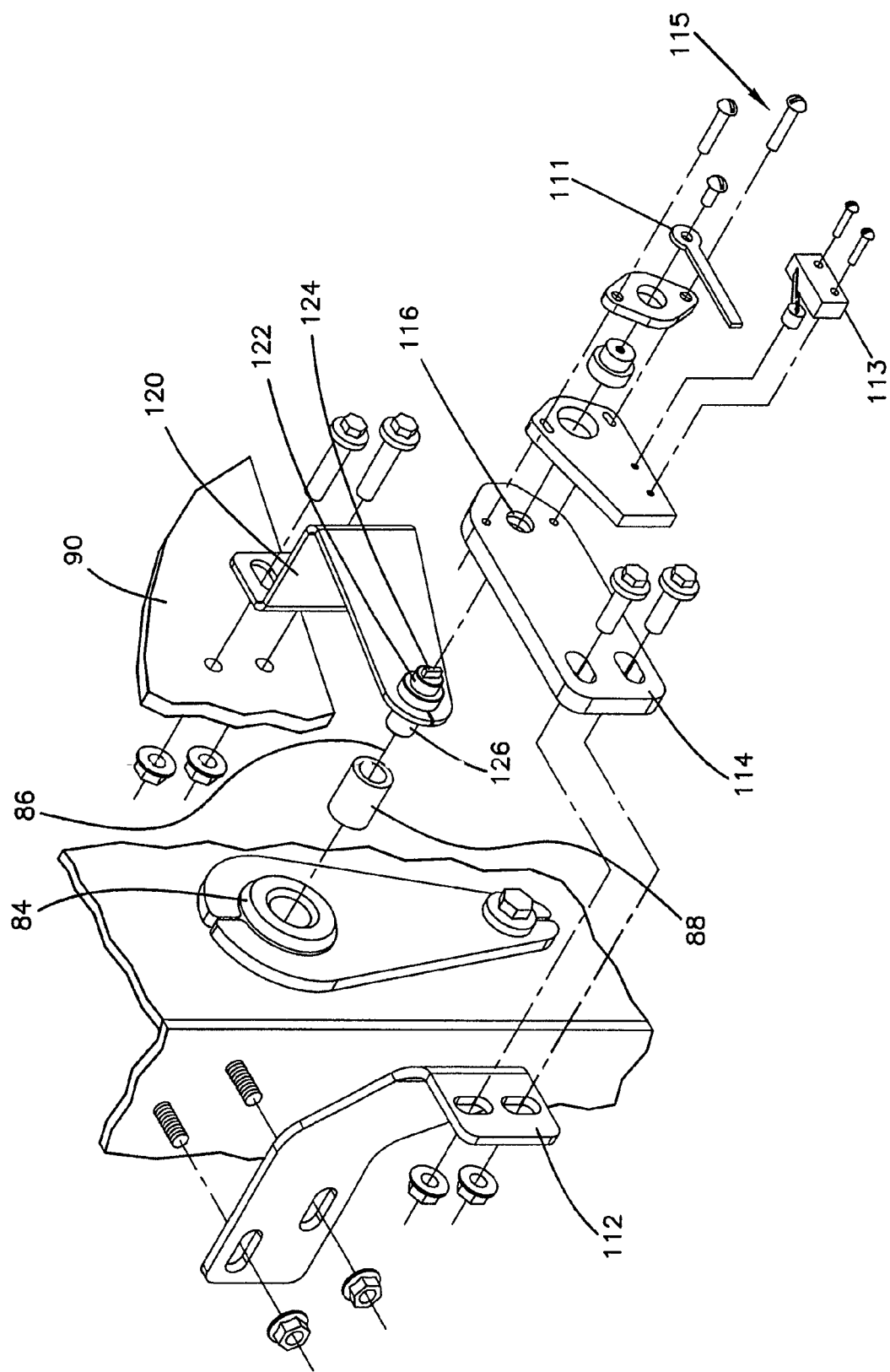
FIG. 7B is an assembly view of a limit switch mount assembly used in the chipper of FIG. 1.

Referring back to FIGS. 3, 4 and also FIG. 7A-B, the mount arrangement for the rotary potentiometer 110 is described in greater detail. In the depicted embodiment the potentiometer 110 is mounted to the chipper frame 120 via support brackets 112 and 114. An actuator 121 is bolted to the arm 90 of mount assembly 50 so that the actuator 121 will move, relative to the support bracket 114, when the upper feed roller 30 moves up and down. The support bracket 114 includes an aperture 116 sized to accept a pilot 122 of actuator 121. The arrangement ensures that the pilot 122 is coaxial with the aperture 116. The actuator 121 further includes a drive tab 124, configured to engage with the rotary potentiometer 110, and a shaft 126 that is configured to mate with tube 88. Tube 88 fits with pin 84 to ensure that the pilot 122 and tab 124 are coaxial with the pivot axis 86, so that the rotary potentiometer can accurately measure the angular position of arm 90. It should be appreciated that there are many other alternative means for measuring the position of the upper feed roller 30. FIG. 7B depicts one alternative embodiment of a sensor arrangement that includes a limit switch assembly 115 in place of the rotary potentiometer 110. In the alternative embodiment the switch 113 is activated by a bar 111 that contacts the switch 113 when the arm 90 moves upward. In the depicted alternative embodiment the switch 113 functions as a sensor in that it senses the general position of the feed rollers (e.g., whether the feed roller is in a lowered position or a raised position).

Figure 8:
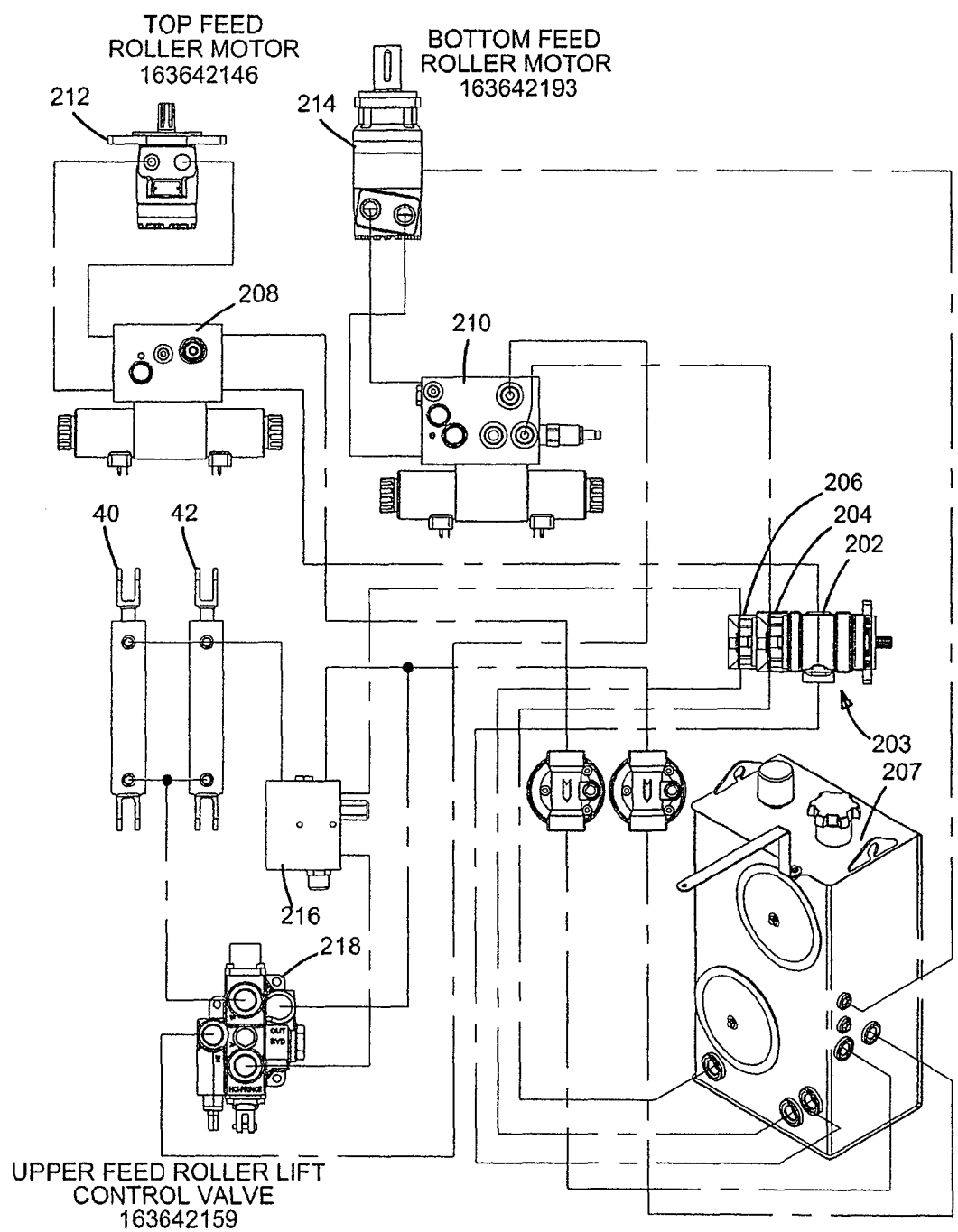
FIG. 8 is a schematic of hydraulic connections for the chipper of FIG. 1.
Figure 9:
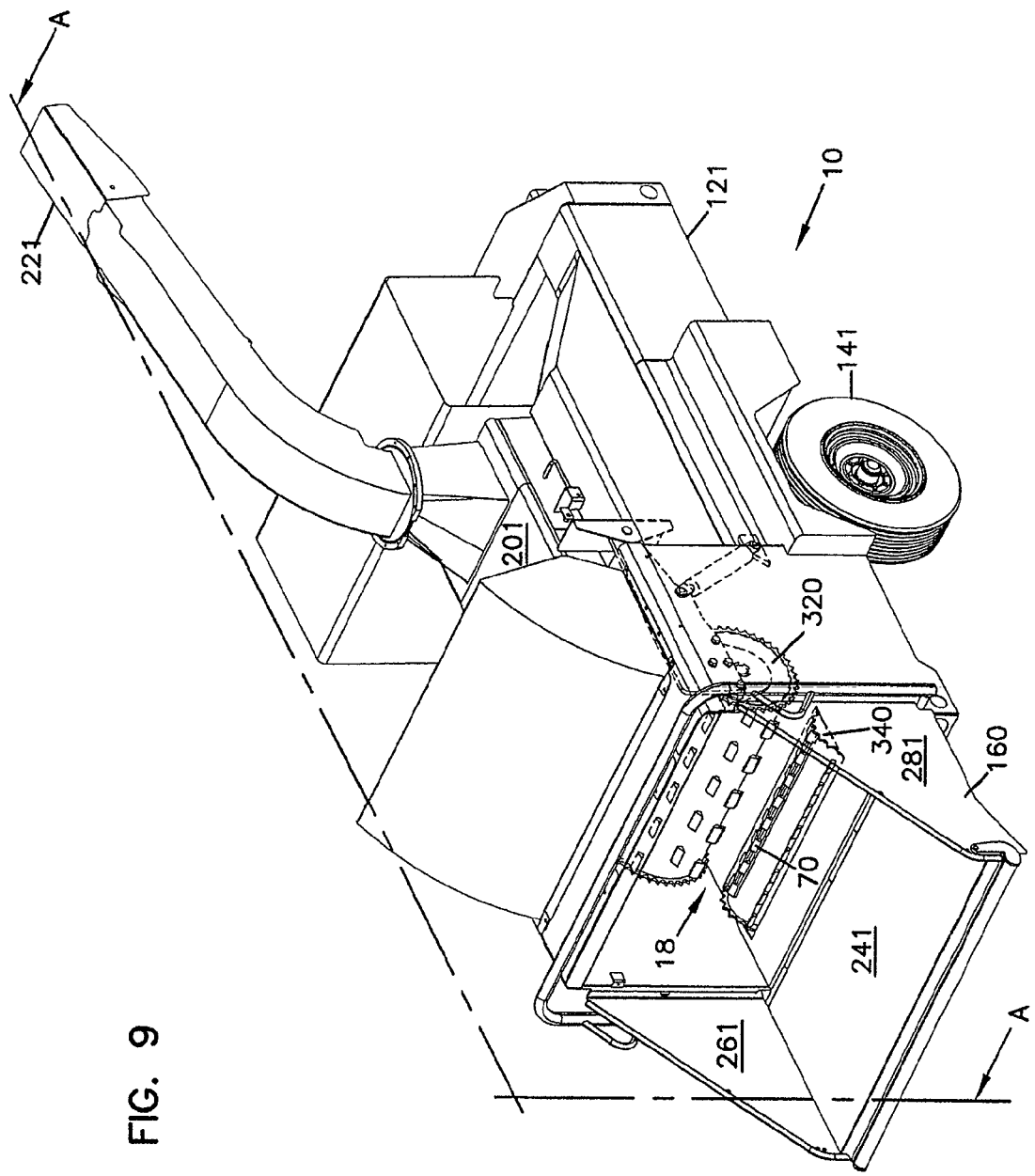
FIG. 9 is a perspective view of an alternative embodiment of the chipper of FIG. 1 with certain portions of the chipper shown in hidden lines.

Referring to FIG. 8 the chipper 100 of FIG. 1 includes a three section pump 203. The pump 203 is driven directly by the engine 101, in any of a number of known methods. The first section 202 of the pump 203 provides hydraulic fluid to valve 208 that controls the flow to motor 212. The first section 202 can either interrupt flow so that there is no fluid transferred to the motor 212 so that the motor 212 does not rotate, or enabling flow in either direction causing the motor 212 to rotate in either the clockwise or counterclockwise direction. This control is accomplished by an electronic control system. It should be appreciated that many other control valve systems can be used, including a mechanical control system.

The second section 204 of the pump 203 provides hydraulic fluid to valve 210, which likewise controls flow to motor 214. Motor 214 is connected to the lower feed roller 36 in any known manner. Here again the valve 210 controls the hydraulic flow such that the motor 214 is either stationary, not rotating, or is rotating in either direction. The direction of rotation of this motor may be synchronized with the direction of rotation of the upper feed roller, such that when the upper feed roller is stationary, the lower roller is also stationary, and when the upper feed roller is rotating counter clockwise the lower feed roller is rotating clockwise, and when the upper feed roller is rotating clockwise the lower feed roller is rotating counterclockwise. The control system for this valve may also be either electronic or mechanical.

Still referring to FIG. 8, the pump includes a third section 206 that is different than sections 202 and 204 which are sized to provide flow adequate to provide power to rotate the feed rollers. Section 206 only provides flow to valve 216 which primarily controls the hydraulic pressure applied to the feed roller cylinders 40 and 42. When the upper feed roller 30 is in a fixed position, then no flow rate is required to maintain a desired force. When the feed roller 30 moves to engage differing sizes of logs, then the cylinders 40 and 42 either extend or retract. When the cylinders 40, 42 retract to move the feed roller 30 down to maintain engagement with a log that gets smaller in diameter the section 206 provides fluid flow to the rod-end of the cylinders 40 and 42. The maximum flow rate of the third section 206 will define how quickly the feed roller can be moved downward. When the feed roller attempts to climb up onto a log, the cylinders 40 and 42 will be forced to extend. The flow rate of the third section 206 does not affect how quickly this can occur. The third section 206 can be sized to provide adequate rate of downward movement of the upper feed roller 30. This requirement results in a pump that is much smaller than either the first or the second sections of the pump 203. An advantage of this system is that since most of the time the cylinders are not moving quickly, a small pump can be used to maintain the desired down pressure. When the feed roller is rotating in a stationary position, then the flow from this third pump section 206 passes over a relief valve that is set to achieve a desired pressure in the cylinders 40 and 42, and the fluid passes to back to tank 207. When hydraulic fluid passes through a relief valve it creates heat in the hydraulic fluid and translates to a parasitic power loss that affects the overall efficiency of the machine. Therefore, minimizing the amount of fluid that passes over the relief valve by using a smaller pump is desirable.

Referring to FIGS. 9-13, the feed system 18 of a second embodiment of the chipper 10 is described in greater detail below. The chipper 10 includes a frame 120 on wheels 141 with a feed chute 160, a main body portion 201, and a discharge chute 221. Unlike the feed chute 20 in the first embodiment, the feed chute 160 in the second embodiment includes parallel rather than tapered sides 261, 281. Similar to the first embodiment, the feed system 18 of the second embodiment includes an upper feed roller 320 and a lower feed roller 340. The upper feed roller 320 rotates counterclockwise and the lower feed roller 340 rotates clockwise to grab and pull material into the chipper 10. To clear jams the upper feed roller 320 rotates clockwise and the lower feed roller 340 rotates counterclockwise to push material out the chipper 10.

In the second embodiment, the rotation is powered by a hydraulic drive motor similar to those in the first embodiment shown in FIGS. 4, 5, and 8. In the depicted embodiment the lower feed roller 340 is positioned closer to the chute 160 than the upper feed roller 320. The axis of the lower feed roller 340 is below the table portion 241 of the feed chute 160. The teeth on the lower feed roller 340 are projecting above the surface of the table 241. In the depicted embodiment, portions of the lower feed roller 340 other than the teeth extend above the surface of the table 241. Also, the upper 320 and lower 340 feed rollers overlap when viewed from above (i.e., the vertical direction). In the particular embodiment, the overlapping portion of the upper and lower feed rollers 320, 340 measured horizontally in the front-to-back direction is less than the radius of the lower feed roller. It should be appreciated that other alternative arrangements and configurations are also possible.

Figure 11:
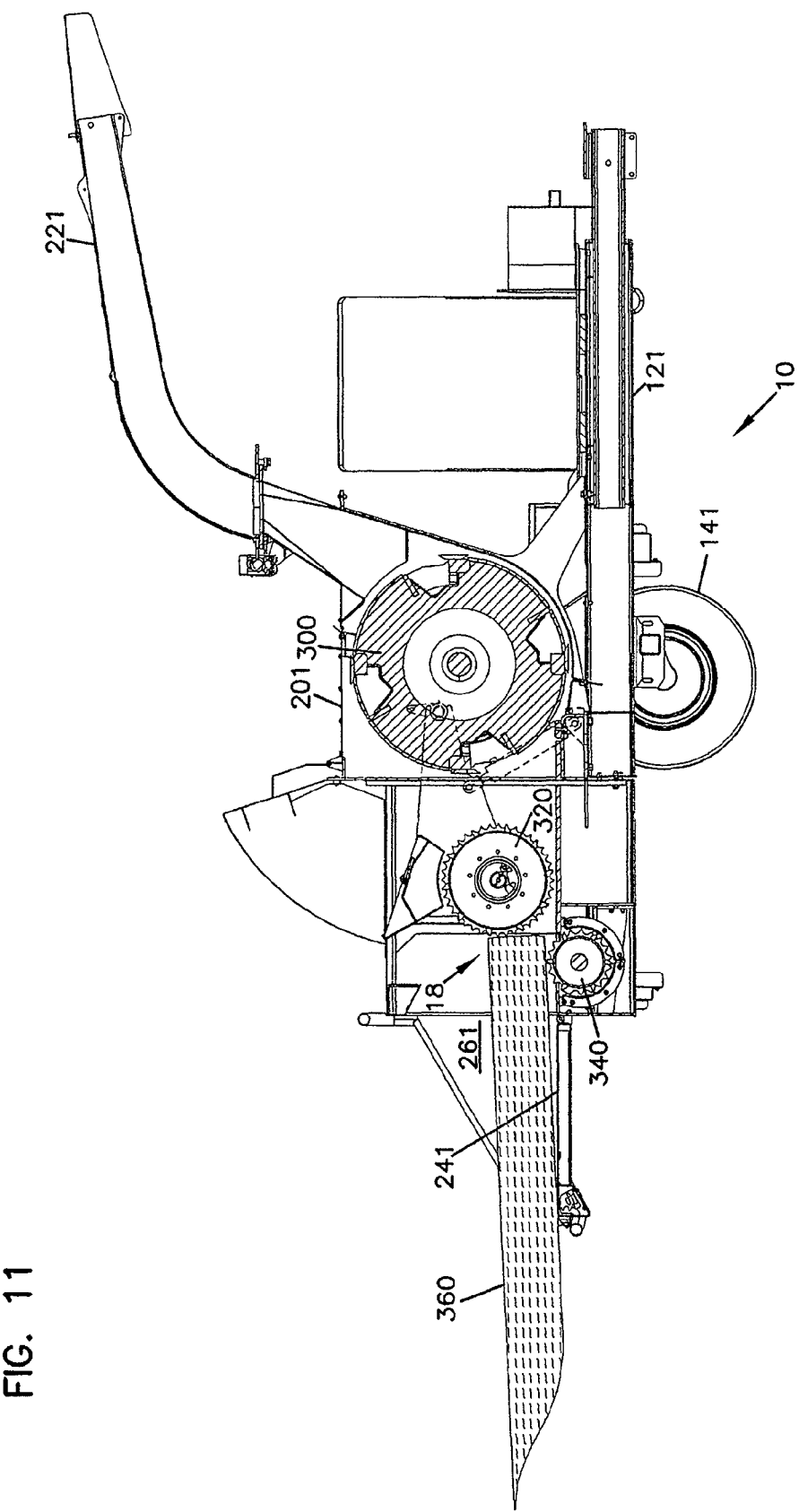
FIG. 11 is a side cross-sectional view of the chipper along lines A-A in FIG. 9 with a log on the feed chute.
Figure 12:
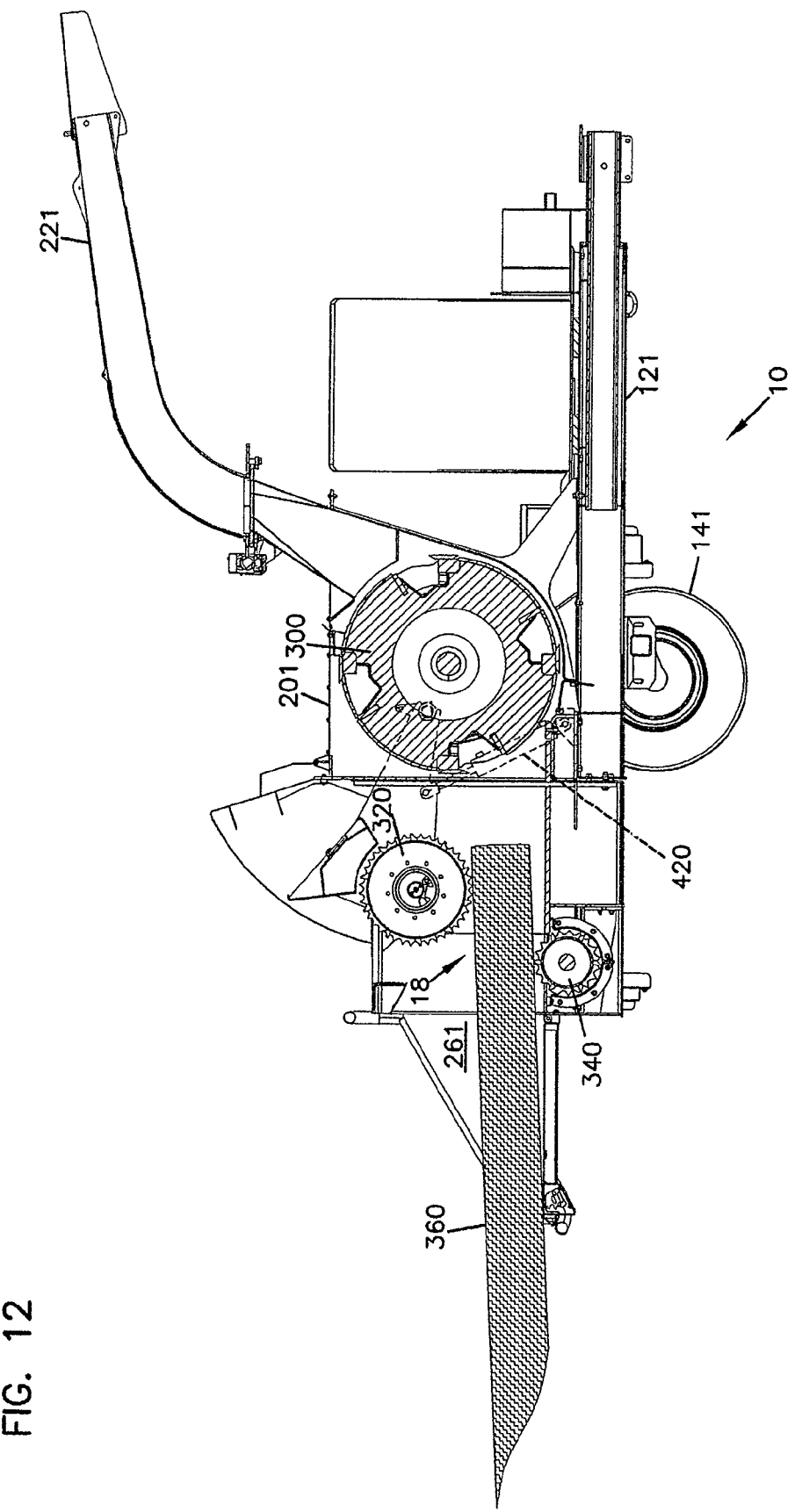
FIG. 12 is a side cross-sectional view of the chipper along lines A-A in FIG. 9 with a log engaged in the feed rollers.

Referring to FIGS. 11 and 12, a log 360 is shown being loaded into the chipper 10. In FIG. 11 the log 360 is shown on the table portion 241 of the chute 160 engaged with the lower feed roller 340. The lower feed roller 340 engages the bottom surface of the log 360 and drags the log 360 up against the upper feed roller 320. The upper feed roller 320 climbs the end of the log 360 and engages the top surface of the log 360. Then the upper and lower rollers 320, 340 cooperatively pull the log 360 into the chipper body 201.

Referring to FIG. 13, the upper roller 320 is shown mounted to a mount assembly 390 that allows the upper roller 320 to pivot up and down to adjust for the different thickness of logs and brush. The bracket assembly includes a pair of arms 380, 400 that rotatably connect to the first end 460 and the second end 480 of the upper feed roller 320. The arms 380, 400 have a length L1 that extends in a front-to-back direction relative to the chipper body. Ends 410 of the arms 380, 400 pivotably attach to the body 201 of the chipper 10 about a horizontal axis A1 that extends across the width of the chipper 10. In the depicted embodiment a cylinder 420 is attached to both arms 380, 400. Also, a guard 440 is mounted between the arms 380, 400 on top of the feed roller 320 to prevent brush from entering the chipper 10 above the upper feed roller 320. The length L1 of the arms in the depicted embodiment is greater than the diameter D1 of the upper feed roller 320. It should be appreciated that many other configurations of the mount assembly 390 are possible.

Figure 14A:
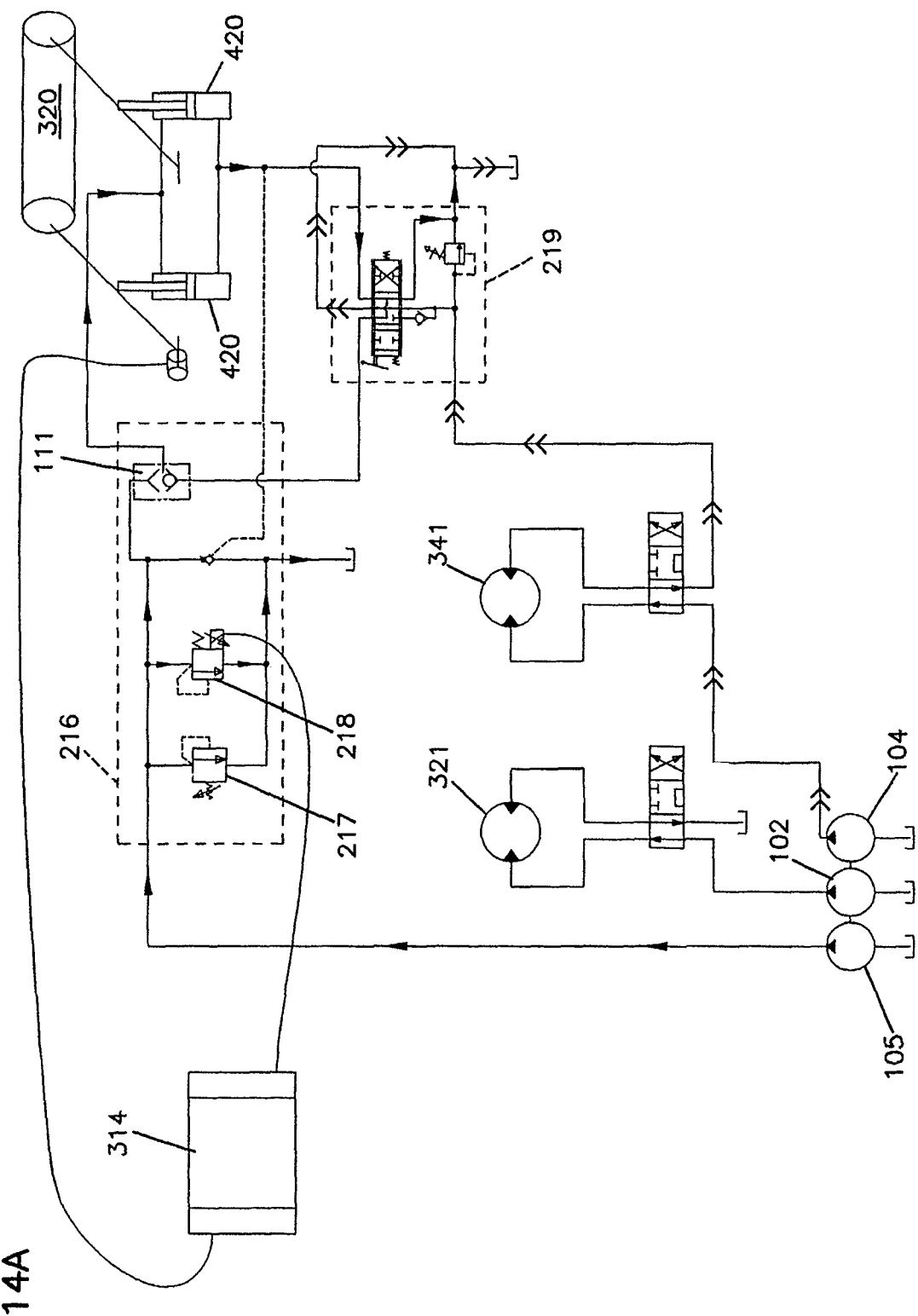
FIG. 14a is a hydraulic circuit diagram of the feed control system of FIGS. 1 and 9 shown in a first state.
Figure 14B:
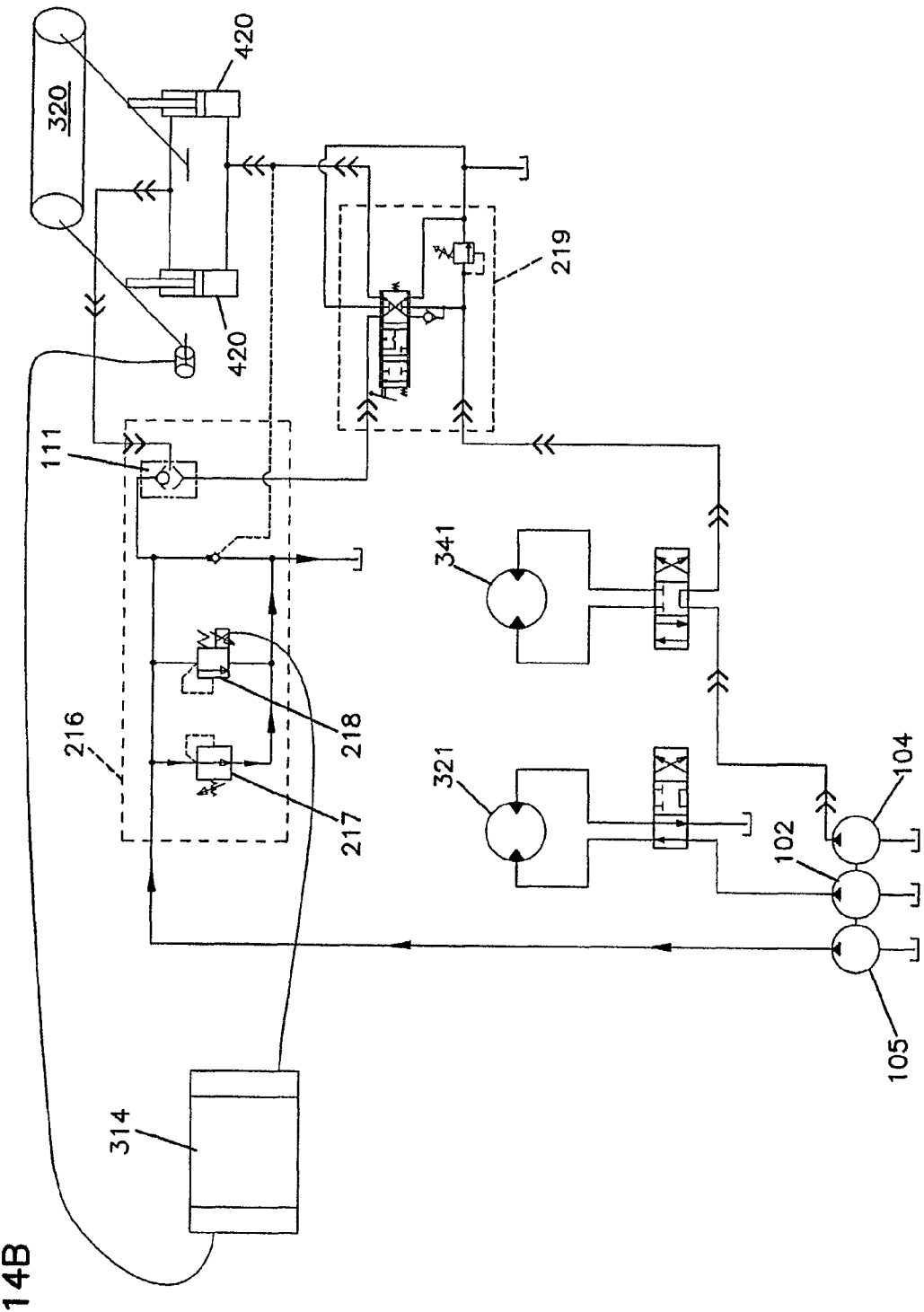
FIG. 14b is the hydraulic circuit diagram of FIG. 14a shown in a second state.
Figure 14C:
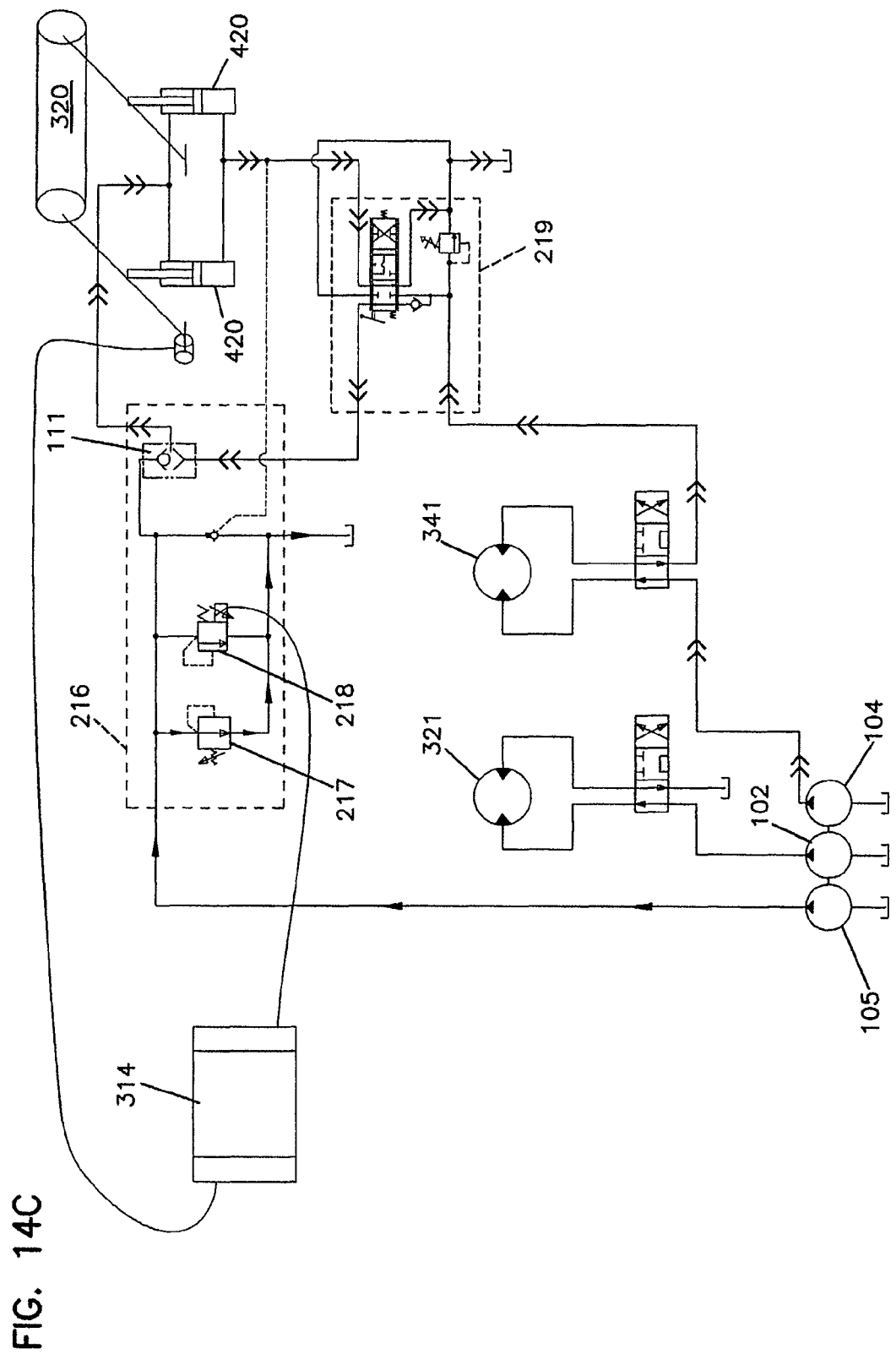
FIG. 14c is a hydraulic circuit diagram of the feed control system of FIGS. 1 and 9 shown in a third state.

Referring to FIGS. 14A-C generally, a hydraulic circuit adaptable for either one of the two embodiments of the feed roller system is shown in various states. For convenience, the hydraulic circuit will be described with reference to the second embodiment. In the depicted embodiment, the hydraulic circuit supplies fluid to drive the rotation of the feed rollers' motors 321 and 341, and also supplies fluid to the cylinders 420 that are arranged to move the upper feed roller 320 to facilitate the feed rollers' 320, 340 grip on the materials to be chipped.

The depicted embodiment includes three hydraulic pumps 105, 102, 104. Pump 102 primarily drives (rotates) the upper feed roller 320 and pump 104 primarily drives (rotates) the lower feed roller 340. In the depicted embodiment, pump 105 is used to power the cylinders 420 that move the upper feed roller 320. In other words, pump 105 is used to control the amount of down pressure that the upper feed roller 320 applies to the materials to be chipped. In the depicted embodiment, pump 105 has a smaller displacement than pumps 102 and 104. The displacement of pump 105 can be, for example, less than 0.1 in$^3$ per revolution. Since typically only a very small flow is needed to cause the cylinders 420 to apply the required down pressure, the depicted configuration, which employs the small displacement pump, minimizes the total machine's hydraulic inefficiency.

In addition, because the depicted arrangement includes a dedicated pump for applying down pressure, not all of the hydraulic oil must be consumed at the highest demand for pressure. Since pump 105 is relatively small, the hydraulic circuit is configured to allow another pump 104 to supply oil in the event that more flow is required. Because the cylinders 420 are powered by their own pump 105 rather than the same pumps 102, 104 that drive the feed rollers 320, 340, the down pressure applied by the cylinders 420 can be continuous and consistent, as it does not depend on the rotation of the feed rollers 320, 340. In the depicted embodiment, the relief valves in valve 216 include two different valves: one that is set at a fixed relief setting 217, which is set to protect the hydraulic components and defines an absolute maximum pressure, and a second adjustable valve 218 that can be set by the controller 314 to provide a variable pressure as desired.

Valve 216 further includes a shuttle valve 111 that allows oil from pump 104 to be applied to the cylinders 420 when valve 219 is manually activated. This allows an operator to manually control a down pressure on the feed roller 320, and when doing so, utilizes the higher flow from the pump 104, so that it occurs faster than it would if only the flow from pump 105 was utilized. Valve 219 can also be activated manually to lift the feed roller 320. When this occurs the hydraulic flow from pump 104 is directed to the butt-end of the cylinders 420. Since the pressure from pump 104 will be set to exceed the variable pressure setting for pump 105, the cylinders will be forced to extend, raising the feed roller 320. An advantage of the above system, wherein the force on the upper feed roller 320 is constantly controlled by regulation of the pressure to cylinders 420, is that the feeding characteristics can be tailored to optimize the performance of the machine.

Referring to FIG. 14A, the system is shown in a first state where pump 105 is applying a downward force on the upper feed roller 320, and pumps 102, 104 are driving the rotation of the feed rollers' motors 321, 341. Hydraulic fluid from pump 105 flows through shuttle valve 111 into the rod-end of the cylinders 420, thereby contracting the cylinders 420 and lowering the upper roller 320, which causes the upper feed roller 320 to press against the materials to be chipped. The force is regulated by controller 314 which adjusts valve 218 to allow a certain amount of fluid to flow from the pump 105 into the tank. Hydraulic fluid from pump 102 flows through motor 321 and back to the tank, and hydraulic fluid from pump 104 flows through motor 341 and valve 219 and back to the tank.

Referring to FIG. 14B, the system is shown in a second state where pump 102 drives the upper feed roller, the fluid from 105 is directed to the tank, and fluid from pump 104 is used to raise the upper feed roller. This state occurs when the operator manually actuates valve 219. Since in the depicted embodiment the displacement of pump 104 is greater than the displacement of pump 105, using pump 104 to raise the upper feed roller is more effective than using pump 105.

Referring to FIG. 14C, the system is shown in a third state where pump 102 drives the upper feed roller, the fluid from 105 is directed to the tank, and fluid from pump 104 is used to lower the upper feed roller. This state occurs when the operator manually actuates valve 219. Since in the depicted embodiment the displacement of pump 104 is greater than the displacement of pump 105, using pump 104 to lower the upper feed roller enables the upper feed roller to be lowered at a faster rate than if pump 105 is used. Also, in the third state the operator can conveniently override the control system 314 and can apply more or less down pressure as needed. In the depicted embodiment, the motor 341 is shown driven when the pump 104 is used to raise the upper feed roller 320. It should be appreciated that many other states of the depicted embodiment are also possible.

Figure 15A:
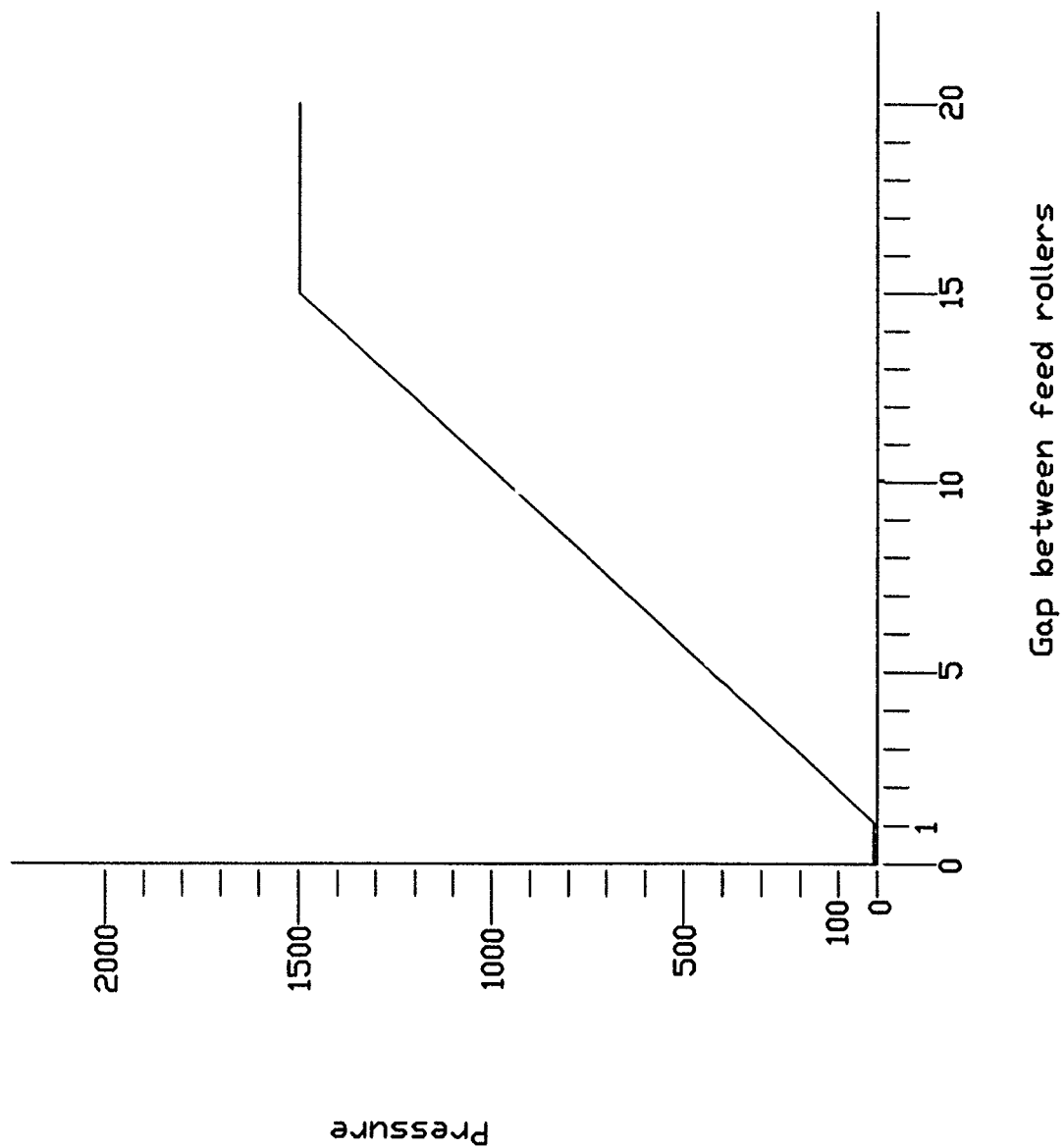
FIGS. 15a and 15b are graphs illustrating examples of possible relationships between the pressure applied to the feed rollers and the distance between the feed rollers of FIGS. 1 and 9.

Referring to FIG. 15a, a graph shows that the pressure in the cylinder 420 increases as the gap between the upper and lower feed rollers 320, 340 increases. This relationship causes the upper feed roller 320 to apply greater down pressure on the material to be chipped when the material to be chipped is larger. This is desirable because more down pressure is generally required to cause the feed rollers 320, 340 to effectively grip larger and heavier objects. For example, if the diameter of a log to be chipped is 15 inches, the cylinder is pressurized to approximately 1500 psi, whereas if the diameter of the log to be chipped is 5 inches, the cylinder is pressurized to approximately 500 psi. In the depicted embodiment no pressure is applied if the gap between the feed rollers 320, 340 is less than one inch, and a constant amount of pressure is applied when the gap between the feed rollers is larger than 15 inches. In the depicted embodiment, the gap between the feed rollers 320, 340 is monitored by an angular position sensor (e.g., a rotary potentiometer 110) that is mounted to the end 410 of the arm 400. The angular position sensor provides the input to the controller 314 (FIG. 14) which controls the hydraulic valve that adjusts the pressure in the cylinder 420.

Figure 15B:
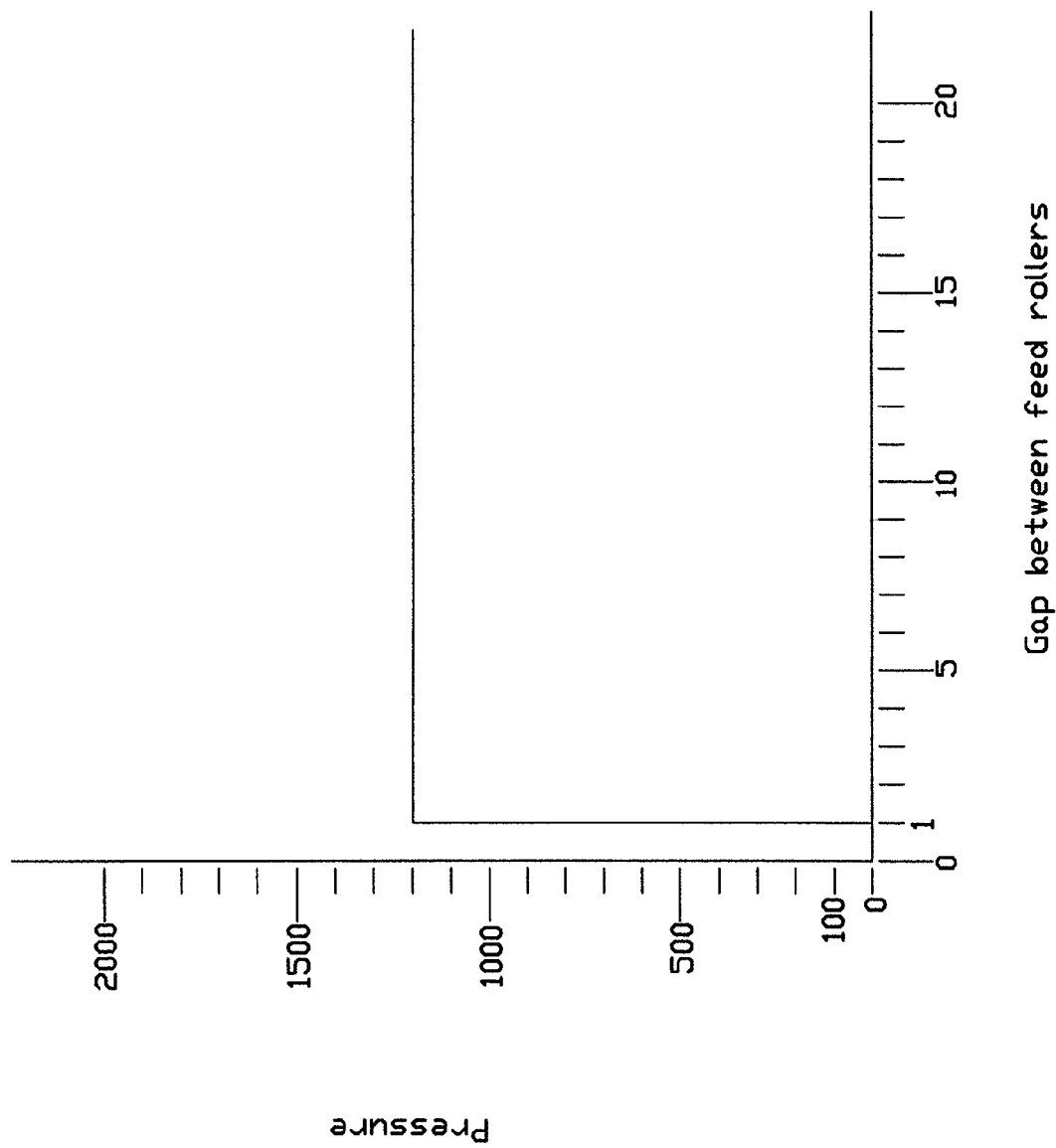

FIG. 15b shows that the pressure in the cylinder 420 can be held constant as the gap between the upper and lower feed rollers 320, 340 increases. In the depicted embodiment the upper feed roller 320 applies a constant pressure on the material to be chipped when the material to be chipped is larger than one inch.

In addition, decreasing the pressure between the upper and lower feed rollers 320, 340 in some circumstances can enable the upper feed roller 320 to more effectively climb the material to be chipped (e.g., a log, brush). In the depicted embodiment the control system can be programmed to provide a delay in applying the pressure so that the feed roller 320 can climb the material to be chipped before the pressure is applied by turning on valve 218. In one embodiment a switch starts the time delay. In such an embodiment, the switch can be the type that is activated via physical contact with a portion of the upper feed roller assembly as shown in FIG. 7B. Referring back to FIG. 7B, the limit switch 113 is activated once the upper feed roller 320 has begun to climb the material to be chipped. It should be appreciated that a rotary potentiometer could also be used to start the delay.

The time delay before valve 218 is turned on (energized) can be any length of time. For example, if it is known that the upper feed roller 320 typically takes three seconds to climb, the pressure application delay can be programmed to be three or more seconds. The delay can also be set based on the upper feed roller's 320 climb rate, which can be estimated based on the rate the feed rollers 320, 340 rotate and/or based on the rate the upper feed roller 320 moves in the upwardly direction.

Figure 16:
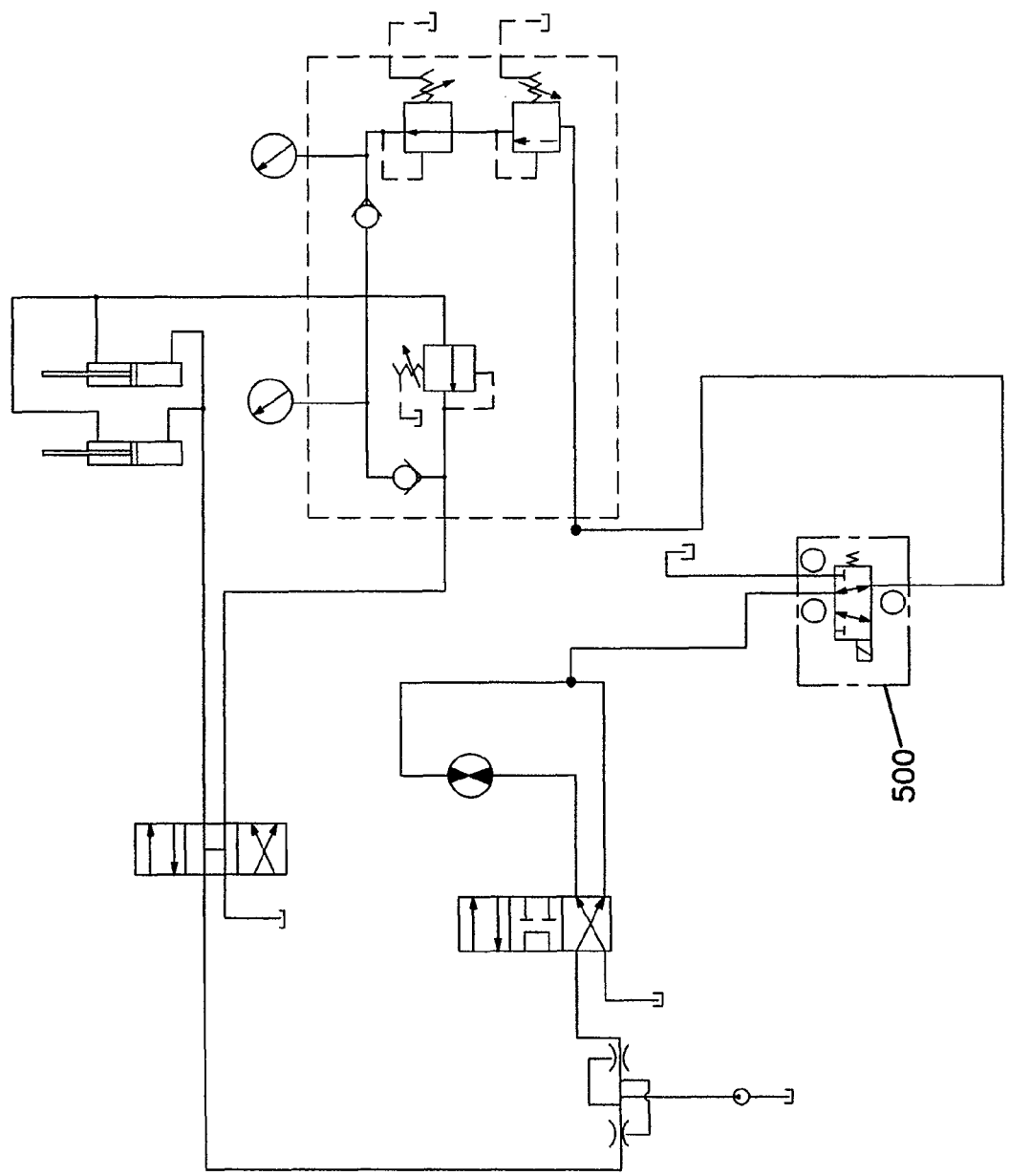
FIG. 16 is an alternative embodiment of a hydraulic circuit that enables the pressure in the hydraulic cylinders to be varied or turned on and off.

FIG. 16 discloses an alternative embodiment of the system. The figure is similar to FIG. 5 in US 2003/0111566, which is incorporated in its entirety herein by reference. The main difference is that a valve 500 has been included, which provides a mechanism for adjusting the pressure in the circuit (e.g., turning on and off the pressure) based on the position of the feed roller.

Referring to FIG. 17, an alternative arrangement is shown for controlling the position of the upper feed roller 320, and the pressure between the upper feed roller 320 and lower feed roller 340 is shown. The depicted arrangement can be referred to as a rear pivot system. The depicted embodiment is used in a system where the operator normally manually feeds the machine, but the down pressure is applied when there is a jam. The down pressure can be triggered by a number of factors individually or in combination with each other. Examples of such factors include: engine speed dropping below a predetermined value or the stopping of the forward feed when the chipper should be feeding.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A chipper comprising:
a feed surface;
a lower feed roller, the lower feed roller being mounted to the chipper such that the axis of rotation of the lower feed roller is below the feed surface;
an upper feed roller, the upper feed roller being mounted to the chipper such that the axis of rotation is movable towards and away from the feed surface;
a hydraulic cylinder for applying a force on the upper feed roller;
a sensor for sensing the position of the upper feed roller; and
a control unit controlling the hydraulic cylinder based on the measured position of the upper feed roller;
wherein the control unit is configured such that the hydraulic cylinder exerts a downward force on the upper feed roller only after the upper feed roller is displaced by a predetermined amount.

2. The chipper of claim 1, wherein the upper and lower feed rollers are generally cylindrical in shape and wherein the axes of rotation of the upper and lower feed rollers are offset in a vertical direction.

3. The chipper of claim 2, wherein the lower feed roller is positioned rearward relative to the upper feed roller.

4. The chipper of claim 2, wherein the upper and lower feed rollers overlap in the vertical direction.

5. The chipper of claim 2, further comprising a mounting arm that is pivotally connected to the chipper frame and connected to an end of the upper feed roller and an end of the hydraulic cylinder.

6. The chipper of claim 1, wherein the control unit is configured to increase the pressure within the hydraulic cylinders when the vertical distance between the feed rollers increases.

7. The chipper of claim 6, wherein the pressure is not increased beyond a predetermined valued once the distance between the feed rollers is greater than a predetermined value.

8. The chipper of claim 1, wherein the control unit is configured to set a constant pressure within the hydraulic cylinders based on the vertical distance between the feed rollers.

9. The chipper of claim 1, wherein the control unit is configured to turn off and on the pressure within the hydraulic cylinder when the vertical distance between the feed rollers increases.

10. The chipper of claim 1, wherein the pressure within the hydraulic cylinders is primarily driven by a hydraulic motor that is not used to drive the rotation of the upper and lower feed rollers.

11. The chipper of claim 10, wherein the control unit is configured such that the operator can cause hydraulic fluid to flow from hydraulic motors used to drive the rotation of the upper and lower feed rollers to drive the hydraulic cylinders.

12. The chipper of claim 1, wherein the control unit is configured such that the hydraulic cylinders apply a force on the upper feed roller only after the upper feed roller is displaced by the predetermined amount and a predetermined time delay after the upper feed roller makes initial contact with material to be reduced has been exceeded.

13. A chipper comprising:
an infeed roller movably mounted to a chipper frame;
a sensor for sensing the position of the infeed roller;
a hydraulic cylinder for applying a force to the infeed roller in response to the measured position of the infeed roller; and
a control unit configured such that the hydraulic cylinder applies force on the upper feed roller only after the feed roller is displaced by a predetermined amount.

14. The chipper of claim 13, wherein the sensor is a rotary potentiometer.

15. The chipper of claim 13, wherein the sensor is a limit switch.

16. The chipper of claim 13, further comprising a controller that varies the pressure in the hydraulic cylinders as a function of the position of the feed roller.

17. The chipper of claim 13, further comprising a first pump configured to drive the rotation of the infeed roller and configured to drive the hydraulic cylinder to manually raise the infeed roller; a second pump configured to drive the hydraulic cylinder to bias the infeed roller in the downward direction, wherein the fluid pressure generated by the second pump is independent from the fluid pressure generated by the first pump.

18. The chipper of claim 17, wherein the second pump has a displacement of less than 0.1 cubic inches per revolution.

19. The chipper of claim 17, wherein the first pump has a greater displacement than the second pump.

20. The chipper of claim 17, wherein the pumps are arranged and configured so that the pressure in the hydraulic cylinder can be varied while the pressure used to drive the infeed rollers is constant.

21. The chipper of claim 13, wherein the control unit is configured such that the hydraulic cylinder applies force on the upper feed roller only after the upper feed roller is displaced by the predetermined amount and a predetermined time delay after the feed roller makes initial contact with material to be reduced has been exceeded.

22. The chipper of claim 13, wherein the control unit is configured such that the hydraulic cylinder applies continuous and linear force on the feed roller after the feed roller exceeds a predetermined displacement.

23. The chipper of claim 22, wherein the continuous and linear force on the feed roller is a constant force.

24. A chipper comprising:
a feed surface;
a first feed roller;
a second feed roller;
a hydraulic cylinder for directing at least one of the first or second feed rollers toward each other;
a sensor for sensing the gap between the first and second feed rollers; and
a control unit controlling the actuation of the hydraulic cylinder based on the measured gap;
wherein the control unit is configured such that the hydraulic cylinder applies a force biasing the first or second feed rollers toward each other only after the gap exceeds a predetermined amount.

25. The chipper of claim 24, wherein each feed roller is cylindrical in shape and includes a horizontally disposed rotational axis.

26. The chipper of claim 24, further comprising a first pump and a second pump, wherein the first pump is used primarily to drive the infeed rollers and the second pump is used primarily to drive the hydraulic cylinders.

27. The chipper of claim 26, wherein the first and second pumps are not identical and are in fluid communication with each other.

28. The chipper of claim 26, wherein the first pump is configured and arranged such that it can be used to drive the hydraulic cylinders.

29. The chipper of claim 24, wherein the control unit is configured such that the hydraulic cylinder applies a force biasing the first or second feed rollers toward each other only after the upper feed roller is displaced by the predetermined amount and a predetermined time delay based on the position of the material to be reduced has been exceeded.

* * * * *